(12) United States Patent
Ritto et al.

(10) Patent No.: US 9,442,963 B2
(45) Date of Patent: Sep. 13, 2016

(54) FLEXIBLE TIME-BASED AGGREGATED DERIVATIONS FOR ADVANCED ANALYTICS

(71) Applicant: Omnitracs, LLC, San Diego, CA (US)

(72) Inventors: Patrick M. Ritto, Racho Santa Fe, CA (US); Pratyush Verma, Suwanee, GA (US); John A. Old, Marietta, GA (US); Lauren K. Domnick, Muskegom, WI (US); Jeffrey D. Gilcrease, Acworth, GA (US)

(73) Assignee: OMNITRACS, LLC, Dallas, TX (US)

(*) Notice: Subject to any disclaimer, the term of this patent is extended or adjusted under 35 U.S.C. 154(b) by 343 days.

(21) Appl. No.: 14/010,687

(22) Filed: Aug. 27, 2013

(65) Prior Publication Data

US 2015/0066861 A1 Mar. 5, 2015

(51) Int. Cl.
*G06F 17/30* (2006.01)
*G06F 7/00* (2006.01)

(52) U.S. Cl.
CPC .............. *G06F 17/30289* (2013.01)

(58) Field of Classification Search
USPC ....................................... 707/661
See application file for complete search history.

(56) References Cited

U.S. PATENT DOCUMENTS

| | | | |
|---|---|---|---|
| 7,725,434 B2 | 5/2010 | Boggs | |
| 8,239,244 B2 | 8/2012 | Ginsberg et al. | |
| 8,352,406 B2 | 1/2013 | Costa et al. | |
| 8,572,163 B1* | 10/2013 | Bromley | G06F 17/30156 707/650 |
| 2010/0153184 A1 | 6/2010 | Caffrey et al. | |
| 2010/0223296 A1* | 9/2010 | Angus | G06F 17/30563 707/795 |
| 2012/0005151 A1 | 1/2012 | Vasudevan et al. | |
| 2014/0280191 A1* | 9/2014 | Cronin | G06Q 30/0201 707/741 |

OTHER PUBLICATIONS

Paul Lane: "Oracle® Database Data Warehousing Guide 11g Release 2 (11.2)" E25554-02, Jul. 2013, hereafter "OraDW11g".*

* cited by examiner

*Primary Examiner* — Kuen Lu
(74) *Attorney, Agent, or Firm* — Arent Fox LLP

(57) ABSTRACT

Methods, system, and devices for improving pre-modeling processing of data for use in predictive modeling. A computing device may be configured to perform operations for processing client data using metadata describing various client-specific parameters. Received client data may be loaded within stage tables based on the client-specific parameters, such flat file locations. The computing device may perform various validation checks on the loaded data, such as checks to identify duplication data records associated with client data received at different times, duplication data records occurring within an overlap period, and deleted records. In an embodiment, the computing device may perform additional checks to validate data records that include changing status information, such as marital status data of an employee. The computing device may use processed client data to generate weekly aggregated tables based on custom aggregation timeframes. In an embodiment, the computing device may archive aggregated data for subsequent use.

48 Claims, 16 Drawing Sheets

| Record ID | Created Date | Reference ID | Event Date | Run ID | Valid? |
|---|---|---|---|---|---|
| 1 | 2012-07-15 | 0001 | 2012-06-15 | 1 | Y |
| 2 | 2012-07-15 | 0002 | 2012-06-18 | 1 | Y |
| 3 | 2012-07-15 | 0003 | 2012-06-18 | 1 | Y |
| 4 | 2012-07-15 | 0004 | 2012-06-27 | 1 | Y |
| 5 | 2012-07-15 | 0005 | 2012-07-01 | 1 | Y |
| 6 | 2012-07-15 | 0006 | 2010-07-09 | 1 | Y |
| 7 | 2012-07-15 | 0007 | 2010-07-11 | 1 | Y |
| 3 | 2012-08-14 | 0003 | 2012-06-18 | 2 | Y |
| 4 | 2012-08-14 | 0004 | 2012-06-27 | 2 | Y |
| 5 | 2012-08-14 | 0005 | 2012-07-01 | 2 | Y |
| 7 | 2012-08-14 | 0007 | 2010-07-11 | 2 | Y |
| 14 | 2012-08-14 | 0008 | 2010-07-16 | 2 | Y |
| 15 | 2012-08-14 | 0009 | 2010-07-23 | 2 | Y |
| 16 | 2012-08-14 | 0010 | 2010-07-30 | 2 | Y |
| 17 | 2012-08-14 | 0011 | 2010-08-07 | 2 | Y |
| 18 | 2012-08-14 | 0012 | 2010-08-13 | 2 | Y |
| 18 | 2012-08-14 | 0012 | 2010-08-13 | 2 | Y |

FIG. 7D

| Record ID | Created Date | Reference ID | Event Date | Run ID | Valid? |
|---|---|---|---|---|---|
| 1 | 2012-07-15 | 0001 | 2012-06-15 | 1 | Y |
| 2 | 2012-07-15 | 0002 | 2012-06-18 | 1 | Y |
| 3 | 2012-07-15 | 0003 | 2012-06-18 | 1 | N |
| 4 | 2012-07-15 | 0004 | 2012-06-27 | 1 | N |
| 5 | 2012-07-15 | 0005 | 2012-07-01 | 1 | N |
| 6 | 2012-07-15 | 0006 | 2010-07-09 | 1 | N |
| 7 | 2012-07-15 | 0007 | 2010-07-11 | 1 | N |
| 3 | 2012-08-14 | 0003 | 2012-06-18 | 2 | Y |
| 4 | 2012-08-14 | 0004 | 2012-06-27 | 2 | Y |
| 5 | 2012-08-14 | 0005 | 2012-07-01 | 2 | Y |
| 7 | 2012-08-14 | 0007 | 2010-07-11 | 2 | Y |
| 14 | 2012-08-14 | 0008 | 2010-07-16 | 2 | Y |
| 15 | 2012-08-14 | 0009 | 2010-07-23 | 2 | Y |
| 16 | 2012-08-14 | 0010 | 2010-07-30 | 2 | Y |
| 17 | 2012-08-14 | 0011 | 2010-08-07 | 2 | Y |
| 18 | 2012-08-14 | 0012 | 2010-08-13 | 2 | N |
| 18 | 2012-08-14 | 0012 | 2010-08-13 | 2 | Y |

FIG. 7E

Pseudo Code Example: Duplicate Validation

```
UPDATE stage_table*
set VALID_STATUS, FAILURE_CAUSE
where CLIENTID=$$VAR_CLIENTID AND IS_VALID
AND rowid in
(
        select a.rid
        from
        (
                select rowid, row_number over (partition by PERSONREFID, CLIENTID, COLUMN1,
COLUMN2, COLUMN*) rn
                from stage_table*
                WHERE IS_VALID AND RUNID = MAX(RUNID)
                ORDER BY COLUMN*
        ) A
        where rn != 1
);
```

FIG. 7F

Pseudo Code Example: Overlap Validations

```
UPDATE stage_table*
set VALID_STATUS, FAILURE_CAUSE
where CLIENTID=$$VAR_CLIENTID AND IS_VALID
AND ROWID IN
(
        SELECT A.RID
        FROM
        (
                SELECT ROWID RID, ROW_NUMBER() OVER (PARTITION BY CLIENTID,
COLUMN1, COLUMN2, COLUMN3, COLUMN*
                )
                ORDER BY COLUMN* DESC) RN
                FROM stage_table*
                WHERE CLIENTID=$$VAR_CLIENTID AND IS_VALID
                AND DATE_COLUMN* >= MIN(DATE from LATEST RUN DATA) --
OverlapPeriod
        ) A
        WHERE RN != 1
);
```

FIG. 7G

Pseudo Code Example: Delete Validation:

UPDATE stage_table*
set VALID_STATUS, FAILURE_CAUSE
WHERE CLIENTID=$$VAR_CLIENTID AND IS_VALIDATED='Y'
AND RUNID < MAX(RUNID)
AND DATE_COLUMN* >= MIN(DATE from LATEST RUN DATA) – OverlapPeriod;

FIG. 7H

Pseudo Code Example: Cleanup Validation:

UPDATE stage_table*
set VALID_STATUS, FAILURE_CAUSE
where CLIENTID=$$VAR_CLIENTID AND IS_VALID
AND ROWID IN
(
    SELECT A.RID
    FROM
    (
        SELECT ROWID RID, ROW_NUMBER() OVER (PARTITION BY CLIENTID, COLUMN1, COLUMN2, COLUMN3, COLUMN*)
        ORDER BY COLUMN* DESC) RN
        FROM stage_table*
            WHERE CLIENTID=$$VAR_CLIENTID AND IS_VALID
            AND RUNID <= MAX(RUNID)
    ) A
    WHERE RN != 1
);

FIG. 7I

Pseudo Code Example: Hash Code

```
UPDATE stage_table
set VALID_STATUS, FAILURE_CAUSE
where CLIENTID=$$VAR_CLIENTID AND IS_VALID
AND rowid in
(
select S2.rowid
from
(
        select S1.*
        ,LEAD(S1.HASH, 1, 0) OVER (PARTITION BY personrefid,clientid,companyid ORDER BY perscreatedt desc NULLS LAST) NEXT_HASH
        from
        (
                select rowid,*,hash4( PERSONREFID ||CLIENTID ||COLUMN1 ||COLUMN2 ||COLUMN*,0) HASH
                from stage_table
                where clientid = $$VAR_CLIENTID and IS_VALID
                and runid = MAX(RUNID)
                ) S1
        ) S2
        WHERE S2.NEXT_HASH = S2.HASH
);
```

FIG. 8B

| | 901 Record ID | 902 Created Date | 903 Reference ID | 904 Event Date | 905 Status Code | 906 Valid? |
|---|---|---|---|---|---|---|
| 910 | 1 | 2012-07-15 | 0001 | 2012-01-01 | A | Y |
| 911 | 2 | 2012-07-16 | 0001 | 2012-01-01 | A | Y |
| 912 | 3 | 2012-07-20 | 0001 | 2012-01-01 | D | Y |
| 913 | 1111 | 2012-07-01 | 0002 | 2010-08-22 | D | Y |
| 914 | 4 | 2012-07-01 | 0002 | 2010-08-22 | A | Y |
| 915 | 5 | 2012-07-02 | 0002 | 2010-08-22 | D | Y |
| 916 | 6 | 2012-07-03 | 0002 | 2010-08-22 | A | Y |
| 917 | 7 | 2012-07-04 | 0002 | 2010-08-22 | D | Y |

FIG. 9A

| | 901 Record ID | 902 Created Date | 903 Reference ID | 904 Event Date | 905 Status Code | 906 Valid? |
|---|---|---|---|---|---|---|
| 910 | 1 | 2012-07-15 | 0001 | 2012-01-01 | A | Y |
| 911 | 2 | 2012-07-16 | 0001 | 2012-01-01 | A | Y |
| 912 | 3 | 2012-07-20 | 0001 | 2012-01-01 | D | Y |
| 913 | 1111 | 2012-07-01 | 0002 | 2010-08-22 | D | N |
| 914 | 4 | 2012-07-01 | 0002 | 2010-08-22 | A | Y |
| 915 | 5 | 2012-07-02 | 0002 | 2010-08-22 | D | Y |
| 916 | 6 | 2012-07-03 | 0002 | 2010-08-22 | A | Y |
| 917 | 7 | 2012-07-04 | 0002 | 2010-08-22 | D | Y |

FIG. 9B

| | 901 Record ID | 902 Created Date | 903 Reference ID | 904 Event Date | 905 Status Code | 906 Valid? |
|---|---|---|---|---|---|---|
| 910 | 1 | 2012-07-15 | 0001 | 2012-01-01 | A | Y |
| 911 | 2 | 2012-07-16 | 0001 | 2012-01-01 | A | N |
| 912 | 3 | 2012-07-20 | 0001 | 2012-01-01 | D | Y |
| 913 | 1111 | 2012-07-01 | 0002 | 2010-08-22 | D | N |
| 914 | 4 | 2012-07-01 | 0002 | 2010-08-22 | A | Y |
| 915 | 5 | 2012-07-02 | 0002 | 2010-08-22 | D | Y |
| 916 | 6 | 2012-07-03 | 0002 | 2010-08-22 | A | Y |
| 917 | 7 | 2012-07-04 | 0002 | 2010-08-22 | D | Y |

FLEXIBLE TIME-BASED AGGREGATED DERIVATIONS FOR ADVANCED ANALYTICS

BACKGROUND

Predictive modeling systems are widely used to forecast and assess risks in business activities, personal lives, and other endeavors based on time-based events. To make predictions and recommendations for future actions, such systems may process large caches of raw data, such as provided by client entities via data warehouses, databases, flat files, etc. After processing raw data, predictive systems may use models to identify potential issues, such as safety concerns and business trends (e.g., human resources, employee retention, recruiting activity, workers compensation claims, etc.). For example, based on a trucking company's provided data (e.g., time records for truck driver employees, health records, etc.) gathered over a period, a predictive modeling system may identify the likelihood that a certain driver may have an accident and/or need to file a worker's comp/disability claim. However, current predictive modeling systems may be tied to rigid, recurring periods (e.g., a four (4) week period) for receiving and processing client data. Further, predictive models may not be modified without intensive rebuilding operations during such a long period. A more streamlined solution is needed that allows for more versatile data aggregation for faster, more customized predictive information for client entities.

SUMMARY

In various embodiments, a computing device may perform operations to process client data and generate weekly aggregated tables (WATs) for use in predictive modeling. The WATs may be customized to include various types of data, as well as address various timeframes for aggregations, thus enabling predictive modeling that is flexible and effective for different client entities. The computing device may identify client-specific parameters, such as indicated by metadata stored in relation to client entities, and may customize various operations based on such client parameters. For example, the computing device may aggregate client data into WATs at a certain time based on client-specific parameters.

Client data received by the computing device may be stored within files (e.g., flat files) that may be formatted for subsequent loading into stage data tables of a database. The computing device may perform various operations for formatting and validating data records prior to aggregating client data stored or loaded within stage tables. In particular, the computing device may be configured to perform checks to ensure client data loaded from flat files into database stage tables does not include duplicate data records. For example, the computing device may invalidate data that is received multiple times in an overlap period of subsequent monthly client data runs (or instances of receiving loads of client data). Other validation checks may include verifying whether client data has been purposefully deleted by client entities and whether data from a previous client data run has been duplicated. In an embodiment, the computing device may evaluate certain data tables to identify whether subsequent data records are duplicates or detect indications of valid status changes.

Aggregation operations performed by the computing device may be based on the client-specific parameters that define overlapping periods and the start of aggregation periods. For example, the computing device may perform averaging, sorting, counting, summing, and/or a min/max operation on client data within stage tables based on client-specific parameters indicating an aggregation period associated with the client data. The computing device may combine archived data (e.g., previously aggregated client data) with more recent client data to generate WATs for use with predictive modeling operations. In various embodiments, the computing device may process client data associated with trucking companies, such as driver and trip information.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 7D-7E are diagrams illustrating an exemplary stage table that includes data records that may be checked for validity by a computing device.

FIGS. 7F-7I are listings of exemplary pseudocode for implementing various validity checks in various embodiments.

FIG. 8B is an exemplary pseudocode for implementing a hash for use in validity checks in various embodiments.

FIGS. 9A-9C are diagrams illustrating an exemplary stage table corresponding to the execution of validity checks with versioning considerations on data records by a computing device.

DETAILED DESCRIPTION

Figure 1:
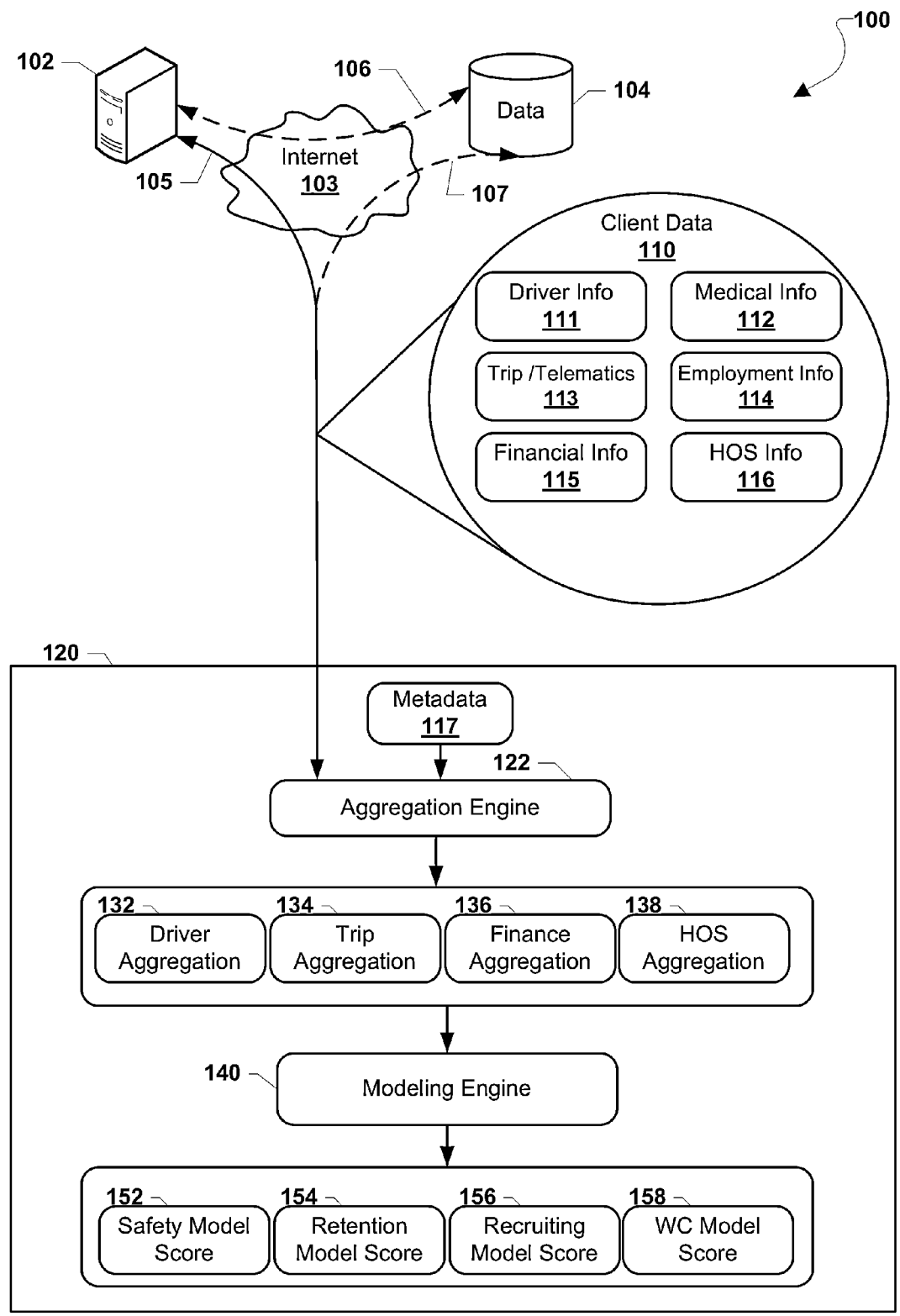
FIG. 1 is a communication system block diagram of a communication network and predictive modeling architecture suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any of a variety of computers or computer systems, servers, database server, personal computers, and similar electronic devices equipped with at least a processor capable of performing operations for processing, storing, and otherwise performing the operations of the various embodiments. Computing devices may also include various interfaces, components, and circuitry for transmitting data, including transceivers, network interfaces, radios, and ports/connections to access various networks (e.g., the Internet, local area networks, etc.).

The various embodiments provide methods, devices, and systems for improving pre-modeling processing of data for use in a predictive modeling system by providing flexibility in how data elements and their associated derivations are aggregated. Pre-modeling processing may include operations for receiving, preparing, validating, and aggregating various data associated with client entities (or customers) that utilize the predictive modeling system. Like conventional techniques, embodiment systems may utilize client data for use in predictive analytics. For example, a computing device within an embodiment system may collect and aggregate over 3000 data elements that are populated in a data warehouse. Further, aggregated data may be delivered to a predictive modeling engine executed by the computing device to utilize models and score results to be presented to client entities. However, unlike other techniques, an embodiment computing device may generate special, weekly aggregation tables (or "WATs") of client data that are processed at customized intervals, such as client-specific dates for starting an aggregation of client data. This customized pre-modeling processing enables predictive modeling to be performed at convenient and effective times for each individual client entity.

In an embodiment, a computing device executing an aggregation engine, software, routines, or other instructions may use client-specific information (or client-specific parameters) that define aggregation periods customized for individual client entities. For example, client-specific parameters from metadata tables accessed by the computing device may indicate different timeframes for a first and a second customer. Such aggregation periods may be less than a modeling prediction term. For example, client data from a client entity may be aggregated into WATs by the computing device using a weekly aggregation period and a monthly prediction term. In an embodiment, the computing device may aggregate client data on a weekly basis to generate approximately 1500 derivations from approximately 3000 stored data elements. In various embodiments, the aggregation period may be more than one week; however, a one-week aggregation period may be the shortest amount of time for which remediation by a predictive modeling system may be performed. However, prediction terms may be any multi-week term that might be required by client entities, as defined within client-specific information accessible to the computing device. For example, the computing device may read-in parameters from client configuration files (or metadata tables accessible to the computing device) that define time frames, thresholds, and other processing requirements for delivering prediction information to various client entities.

Unlike other techniques, the computing device may utilize variable calendar-based configurations to drive the aggregation of client data. In particular, the computing device may utilize metadata that is associated with client data (and/or configured by client entities) that indicates the beginning and end of aggregation periods for each client entity. For example, metadata associated with a trucking company client entity may indicate that an aggregation period starts on a Tuesday and ends on a Monday. Such metadata may define client-specific parameters that may be used by the computing device in the various operations of pre-modeling processing of client data. For example, client-specific parameters within metadata may indicate the types of data to aggregate as well as thresholds for determining invalidity of that data. With such configurable parameters, the computing device may utilize the client entity's input to generate WATs that are more efficient/relevant for use in modeling operations that predict particular client entities' business conditions. As an illustration, metadata associated with client data received from a client entity device may indicate that the best time of the week for the computing device to aggregate the received client data is on a Wednesday, as that day coincides with a time within each week that a particular client has time to assess prediction information.

The computing device performing embodiment aggregation operations may summarize, flatten, and/or generate detailed information within WATs for each aggregation period for each client data set. By building WATs with finer, customized granularity (e.g., one-week aggregation periods), the computing device may generate data that is more accessible for modeling engines. Such WATs may still incorporate the full data set provided by client entities (i.e., aggregation operations may not selectively process client data). Further, the computing device may be configured to execute routines, scripts, instructions, and/or modules that are generic in structure so as to be applicable to any type of client data. For example, the computing device may perform operations to aggregate data from a trucking company client entity, a government client entity, and/or a retail store client entity. In other words, the computing device may process and aggregate client data for any type of customer.

Over many aggregation periods and prediction terms, certain client data may be resubmitted, duplicated, and/or become corrupted via the acquisition process with the client entity. For example, over several consecutive one-week aggregation periods, the computing device engine may identify the same "in-cab" numbers (i.e., amount of time a driver is within a truck cab) regarding a trucker associated with a trucking company client entity. To ensure generated WATs include useful, non-redundant data, the computing device executing the aggregation engine may perform validity checks of client data. In particular, the computing device may perform various operations to analyze historical data, such as client data received during multiple client data "runs" (or periodic downloads of client data from client entity devices), to determine the presence of overlapping or redundant data. The computing device may be configured to identify erroneous, corrupt, resubmitted, omitted, modified, or other bad data based on client-specific parameters and thresholds. For example, the computing device executing the aggregation engine may compare data records within from a most recent client data run to older data records to identify duplicate information. Based on validity checks, data records may be invalidated prior to aggregation operations, thus improving the validity of WAT content.

In an embodiment, the computing device may also perform "versioning" checks that evaluate status changes within client data records to determine whether stage tables include erroneous, out-of-date, or alternatively accurate information. For example, the computing device may compare current employee health information to previous personal information (e.g., marital status, health conditions, etc.) to determine whether the current data shows a valid change of status in the employee or merely incorrect data. In an embodiment, the versioning operations may utilize universal parameters applicable to client data from any client entity, or alternatively may utilize client-specific parameters, such as via customized metadata associated with client data.

In an embodiment, the computing device may also be configured to identify data points within client data that have been omitted, deleted, or augmented in between aggregation periods. For example, the computing device may identify when data representing performance statistics for a particular business asset are missing from a weekly client data run.

In various embodiments, the computing device may perform other checking operations to ensure client data is appropriate for use in aggregation operations. In particular, the computing device may perform data completeness checks that identify whether an expected number of rows of data are properly loaded from flat files into stage tables. Such completeness checks may also include operations to identify whether invalidated (or "bad") data is transferred into WATs. In an embodiment, the computing device may perform operations for counting the number of records in a flat file and comparing that number to a number of data records in a corresponding stage table. Additionally, completeness checks may be performed with relation to the loading of data from stage tables into WATs (i.e., the computing device may perform operations to count stage table data records for comparison with WAT data records). For example, when a certain stage table includes data records for a certain number of employees for a certain number of weeks (e.g., 4 weeks), the computing device may confirm that a related WAT table (e.g., a summary WAT table) includes a number of data records equal to the certain number of employees multiplied by the certain number of weeks, minus the number of records that were invalidated (or rejected by the computing device via validation operations).

In another embodiment, the computing device may perform operations for evaluating data integrity that include checking data values in stage table (and WAT) data fields. In particular, data integrity checks may include identifying truncated values by populating fields in data records with the maximum data length. Special data types, such as dates and/or times, may also be verified and/or converted to acceptable data formats. In another embodiment, the computing device may also perform operations for verifying data records in stage tables and/or WATs relate to intended client entities. In other words, as the various embodiments may utilize multi-tenant data records (i.e., data from a plurality of client entities may be represented within a single stage table and/or database), the computing device may confirm that WATs are generated using data related to particular client entities. For example, the computing device may perform queries on stage tables for specific 'loaddt' to ensure that all records within the stage tables are connected, linked, or otherwise associated with the proper client entities (e.g., client identifier/ID/code). The computing device may also compare identifiers associated with stage table data records to source files records, such as header information within flat files. In an embodiment, the computing device may compare the counts of distinct elements (e.g., drivers) for a particular client entity (e.g., trucking company) in stage tables to the number of data records in WATs to determine whether the number of data records within WATs is growing larger for each aggregation cycles (e.g., WATs should increase by the number of employees multiplied by the number of weeks in an aggregation cycle).

In an embodiment, the computing device may perform data completeness checks that identify whether data from stage tables are correctly transformed to WATs based on predefined rules, client-specific parameters, or other functional information. For example, the computing device may be configured to execute operations on test input data sets for comparison with known results data to determine whether the predefined rules are implemented properly. In another embodiment, the computing device may test data quality (i.e., confirm validity) by identifying duplicates records in stage tables, null values, trimmed leading and/or trailing spaces in data values, etc. For example, the computing device may execute scripts to verify that invalid data within a stage table has been marked as invalid (e.g., an invalid flag has been marked, etc.).

In other embodiments, the computing device may perform testing operations to verify whether flat files relevant to particular client entities are loaded into correct directories, data cleansing operations restart if a system failure occurs, and whether standard and/or client-specific validations execute and generate notifications in response to detected invalidity of data records. These various checks may be performed by the computing device at various times during the operation of the methods described below. For example, checks may be performed when the computing device transfers data from flat files to stage tables as well as when archived or stage table data is transferred to WATs.

In various embodiments, client data may be stored within various multi-tenant tables and/or databases. In particular, the computing device may load data records from flat files related to different client entities into the same database. To differentiate between data records of different client entities, the computing device may tag received data and/or data read from flat files with timestamp and client identifier information (e.g., clientID codes, client entityID codes, etc.). For example, data records within a stage table may include client data fields having unique client identifier values. Additionally, stage tables and WAT tables for various client entities may be stored within a single database. Such multi-tenant structures may enable scalable support for a large number of client entities, increased operational efficiency, and reduced cost through standardization and reusability of fewer database elements.

In various embodiments, WATs may be formatted or otherwise configured for use with various database platforms (e.g., IBM Netezza) and predictive modeling platforms (e.g., IBM SPSS predictive modeling platform). Additionally, the computing device may be configured to execute various commands, instructions, software, routines, and/or functionality for processing and aggregating data, such as scripts (e.g., SQL scripts) written for use with Informatica software.

FIG. 1 illustrates a communication network 100 including a predictive modeling architecture suitable for use with various embodiments. The network 100 may include a client computing device 102 associated with a client entity (e.g., a trucking company) and a service computing device 120 associated with a predictive modeling service. The devices 102, 120 may communicate over the Internet 103 using data links 105 that may utilize various Internet protocols.

The client computing device 102 may be a computer, server, or other device capable of processing and/or storing various data related to the business activities of the client entity. For example, the client computing device 102 may be a computer associated with a trucking company that is configured to store, process, and otherwise manage data related to the trucking company, such as human resources data (e.g., employee personal data, addresses, marital status, sick days used, reported injuries/accidents, workers compensation claims, etc.), equipment data (e.g., trucks in a fleet, computers in use in the field, etc.), business data (e.g., trip or route information, liabilities information, budget information, etc.), etc. Such data related to the client entity may be manually entered into the client computing device 102 (e.g., input by human resources employees). In another embodiment, the data may be received via various interfaces and connections with other client entity equipment. For example, the client computing device 102 may receive data from devices (e.g., sensors, transceivers, radios, etc.) within a cargo truck (not shown) via wired or wireless connections, and the data may include information indicating the amount of travel, location information (e.g., GPS coordinates), time a driver spends within a vehicle cab (or "cab time"), and other vehicle operation data (e.g., fuel efficiency, brake usage, diagnostic information about the vehicle components, average speed during travel, hours of active travel, etc.). As another example, the client computing device 102 may be configured to receive and process data from mobile devices carried by employees of the client entity, such as a mobile computing device (not shown) that communicates activity data (e.g., location data, movement data, etc.) via wireless transmissions (e.g., WiFi via a local area network, cellular network via a wide area network, Bluetooth, Zigbee, etc.).

In an embodiment, the client computing device 102 may locally store data or alternatively transmit data related to the client entity to the data storage device 104 via a wired or wireless connection 106 (e.g., WiFi over a local area network, over wide area network, etc.). The data storage device 104 may be a data server, a cloud storage device, local storage drives, and/or any other device capable of storing and maintaining data. In an embodiment, the client computing device 102 and the data storage device 104 may transmit wireless signals (e.g., WiFi transmissions) to a wireless router (not shown) configured to provide a connection to the Internet 103. In an embodiment, the service computing device 120 may also be configured to communicate directly with the data storage device 104 via data links 107 over the Internet 103.

The service computing device 120 may receive client data 110 from the client computing device 102 and/or the data storage device 104 via the Internet 103. Each load of client data 110 received by the service computing device 120 may be referred to as a client data run. The service computing device 120 may receive the client data 110 via a networking interface (not shown) and process the client data 110 using a processor and the predictive modeling architecture described below. In other words, the service computing device 120 may utilize the data links 105, 107 to download the client data 110 via various networking protocols for processing with predictive models. Client data 110 may be received in by the service computing device 120 on a periodic basis (e.g., every week(s), month(s), etc.). For example, an application or other software executing on the processor of the service computing device 120 may utilize the data link 105 to receive the client data 110 from the client computing device 102 for weekly client data runs. In an alternative embodiment, the service computing device 120 may be coupled to local media or storage devices (not shown) that enable access to client data 110. For example, the computing device may access client data 110 stored on an optical media loaded within a media reading device coupled to the computing device (e.g., tape drives, external hard drives, or other computer devices).

Client data 110 received by the service computing device 120 may include various collected information about the client entity, such as the information stored and/or processed the client computing device 102 that may include human resources data, equipment data, and other business data as indicated above. For non-limiting illustration purposes: a trucking or transportation company client entity may transmit client data 110 to the service computing device 120 that may include driver information 111 (e.g., names, addresses, marital status, and other personal information of employees that drive trucks for the client entity), medical information 112 (e.g., information describing sick time of employees, previous disabilities, etc.), trip and/or telematics information 113 (e.g., information indicating trucking routes, scheduled deliveries, previous deliveries, average locations of vehicles, etc.), employment information 114 (e.g., hiring date of employees, termination dates, salary, number of hours worked in a period, etc.), financial information 115 (e.g., payroll data, liabilities, banking information, etc.), and hours of service (referred to as "HOS" in FIG. 1) information 116 (e.g., the number of hours particular drivers have been on the road for a period in relation to government regulations, etc.). In various embodiments, the client data 110 may include any data collected by a client computing device 102 that may be used in aggregation and predictive modeling operations. In another embodiment, the client data 110 may also include descriptive data (e.g., header information, codes, etc.) that indicates the types, amounts, uses, and other characteristics of the information 111-116 transmitted in a client data run.

The service computing device 120 may include various components, modules, software, routines, subsystems, and other units that enable a predictive modeling architecture. In particular, the service computing device 120 may include an aggregation engine component 122 that may be configured to aggregate the client data 110 over a pre-defined time frame, such as a time frame indicated within customizable metadata 117 associated with the client entity and accessible by the service computing device 120. Such metadata 117 may be stored information (e.g., metadata stored within a database table) that indicates various parameters related to an individual client entity's relationship with the predictive modeling service, such as configuration information for aggregating information. The metadata 117 may be configurable by the client entity and thus may be changed from one client data run to the next (i.e., the metadata 117 may be configured upfront based on a client data run).

In an embodiment, the aggregation engine component 122 may utilize a driver aggregation module 132 that may be configured to process historical and current data within the client data 110, a trip aggregation module 134 that may be configured to process mileage, order, and stop information within the client data 110, a finance aggregation module 136 that may be configured to process payment, advance, and other finance related data within the client data 110, and an HOS aggregation module 138 that may be configured to process critical events, fatigue, and other data related to driver activity with reference to regulated thresholds.

The architecture of the service computing device 120 may also include a modeling engine component 140 that may process aggregated data and detailed data of a time period in order to generate predictive scores useful to the client entity. For example, based on aggregated information provided by the aggregation engine component 122, the modeling engine component 140 may generate predictors of whether the client entity may meet objectives for safety of drivers, retaining employees, and meeting other business targets. In an embodiment, the service computing device 120 may further use the modeling engine component 140 for performing two major functions; building models and scoring those models, such as scoring the models in a production context. Additionally, data within WATs may be used by the service computing device 120 for both scoring and building such models.

In various embodiments, the service computing device 120 may utilize various models for predicting issues related to business concerns, such as safety, retention, recruiting, and worker's compensation. However, the service computing device 120 may also utilize other types of models, such as models related to fuel usage, the likelihood that a driver will abandon his/her vehicle prior to paying off a lease, the likelihood that a driver will be both productive and safe, etc. In addition, the service computing device 120 may be configured to build and use models that incorporate data related to a plurality of client entities. For example, the service computing device 120 may be configured to build a model used for predicting the safety of refrigerated trucks using data received from several client entities (e.g., a WAT with data from several trucking companies, etc.).

In an embodiment, the modeling engine component 140 may utilize a safety model score module 152 that may be used to generate predictive information related to the safety of employees of the client entity, a retention model score module 154 that may be used to generate predictive information related to the retention of employees of the client entity, a recruiting model score module 156 that may be used to generate predictive information related to new hire information/potentials, and a workers' compensation model score module 158 (referred to as "WC" in FIG. 1) that may be used to generate predictive information related to claims and/or workforce limitations due to workers compensation issues of the client entity. In an embodiment, the service computing device 120 may utilize the modeling engine component 140 to predict the likelihood that a driver is going to file a worker's compensation claim that may potentially include a lawsuit, time off of work, doctor bills, permanent disability or workforce limitations (temporary or permanent).

In various embodiments, the components 122, 140 and modules 132-138, 152-158 may be software instructions, routines, or other operations executed by a processor within the service computing device 120. In an alternative embodiment, the components 122, 140 and modules 132-138, 152-158 may be performed by a plurality of processors and/or computing devices associated with a predictive modeling service (e.g., a computing farm, distributing computing network, a plurality of server blades, etc.).

Figure 2:
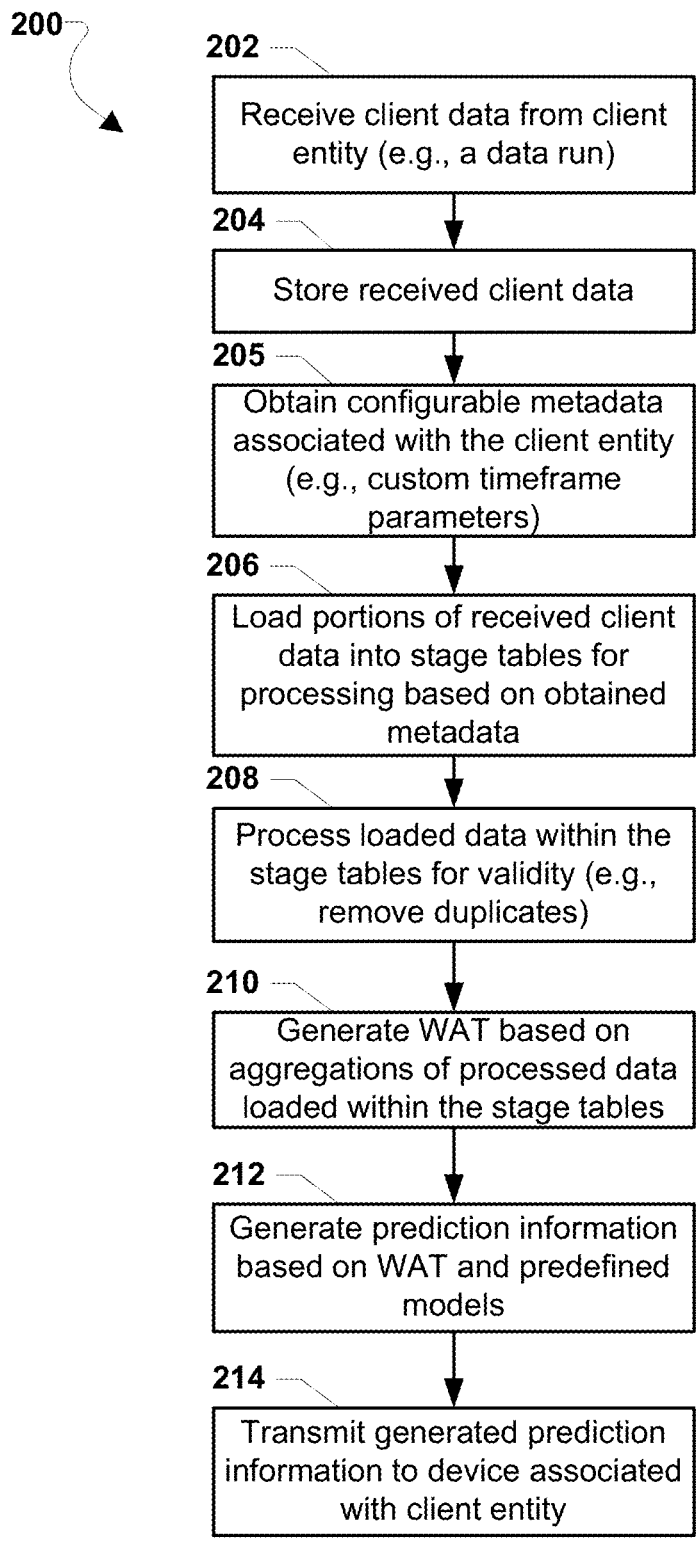
FIG. 2 is a process flow diagram illustrating an embodiment method for a computing device to process client data to generate weekly aggregated tables (WATs) for use with predictive modeling operations.

FIG. 2 illustrates an embodiment method 200 for a computing device to process client data to generate weekly aggregated tables (WATs) for use with predictive modeling operations. In general, the computing device (e.g., a service computing device 120) may perform operations for predicting useful information for various client entities, such as determining the likelihood that a particular employee may encounter a safety issue in the near future based on aggregated client data that indicates previous behaviors of that employee. In various embodiments, the method 200 may be performed by one or more computing devices, such as a plurality of server computing devices associated with a service entity.

In block 202, the computing device may receive client data from a client entity. For example, the computing device may receive the client data via downloads from client devices over the Internet. As indicated above, each transaction in which the computing device receives client data from a particular client entity may be referred to as a "client data run." For example, a first client data run may correspond to data received from a trucking company client entity in June and a second client data run may correspond to data received from the same trucking company in July. In an embodiment, the computing device may receive the data from a file transfer protocol (FTP) site over a wide area network.

In block 204, the computing device may store the received client data, such as within a storage device coupled to the computing device. The computing device may archive or otherwise store data received over time (e.g., over numerous client data runs) and may periodically use the stored data in the predictive modeling operations described below. The stored client data may be stored in various configurations and/or formats, and accordingly may be zipped, compressed, and/or summarized. In particular, the stored client data may be stored within flat files, which may be binary files formatted for efficient and convenient extraction of data into a database or data tables.

In block 205, the computing device may obtain configurable metadata associated with the client entity, such as metadata stored in a database in relation to the client entity. The metadata may include custom parameters (or client-specific parameters) relevant to the client data and configured by the client entity. For example, the metadata may include custom timeframe parameters that may be used by the computing device when processing and/or aggregating the client data. The computing device may be configured to store the metadata in association with the respective client entity, such as in parameter files. For example, the computing device may store and access parameter files for each client entity that transmits client data to the computing device, and each parameter file may include metadata information that indicates the client entity's customized timeframes for aggregating data. In other embodiments, the metadata and/or parameter files may also include other client-specific parameters, such as validity thresholds (e.g., values to use in determining whether data is valid), what type of client data to include in predictive modeling operations, the location (or address) of flat files for use in loading operations, and other client-specific information the computing device may utilize when processing received client data. In various embodiments, the metadata may include parameters generated based on a client data run.

In block 206, the computing device may load portions of the received client data into stage tables for processing based on the obtained metadata. The client-specific parameters of the obtained metadata may indicate the amount of data to load into the stage tables, such as the number of weeks of stored client data that should be loaded from files within a storage device. The loaded portions may represent data records from a plurality of client data runs. For example, the stage tables may be populated with client data received from numerous time periods (e.g., months, years, etc.) in periodic transactions with a client entity. In various embodiments, the computing device may load and map data from flat files into the stage tables. In an embodiment, the flat files may include header rows that provide descriptive information about the flat files and which may not be loaded into stage tables. In an embodiment, the computing device may execute special software for loading the data from flat files into the stage tables, such as enterprise-grade software tools for extracting, transforming, and loading data (e.g., Informatica).

Stage tables may be data tables configured to be controlled, adjusted, queried, and otherwise manipulated using database operations. For example, the stage tables may be data tables that may be queried and updated by the computing device using Structured Query Language (SQL) commands. Stage tables may be multi-tenant in that a single table may include data records related to different client entities. In various embodiments, the computing device may store or otherwise maintain stage tables from one client data run to the next. In other words, a stage table populated with client data from a recent client data run (e.g., January's run) may be used with a second stage table populated with older client data from a previous client data run (e.g., December's run). The computing device may be configured to differentiate between data records of various client entities by utilizing unique client identifier values within fields of the stage table records.

In block 208, the computing device may process the loaded data within the stage tables for validity. In particular, the computing device may be configured to evaluate data within the stage tables to identify and invalidate (or remove) data records that are duplicates of other data records. Duplicates may be loaded into the stage tables when the computing device loads client data from flat files that include data from overlapping time periods. When duplicate records in the stage tables are found, the computing device may perform operations to invalidate the records (e.g., update elements within the stage tables) so that the records are used to generate WATs. For example, the computing device may execute routines to find and invalidate data table records that indicate the exact same data (e.g., same identifiers, same relevant dates, same status information, etc.). Various data validation operations are described further below.

In block 210, the computing device may generate a weekly aggregated table (WAT) based on aggregations of the processed data loaded within the stage tables. For example, the computing device may execute averaging operations, count operations, sum operations, min/max operations, and sort (or sorting) operations on data within the stage data tables to create resulting WATs. In various embodiments, a plurality of WATs may be generated based on the stage tables. In particular, different WATs may be generated for various functional concerns or topics that may be of importance to the client entity. For example, the computing device may generate individual WATs for a trucking company client that each relate to one of employee or driver details, trips and miles (e.g., average miles traveled for a time period), training (e.g., number of hours an employee was in training classes/situations for a period), losses (e.g., number of destroyed or ruined pieces of cargo in a period, etc.), service failure (e.g., number of times cargoes were not delivered on time, etc.), fuel (e.g., average amount of expended fuel per truck per period, etc.), orders (e.g., how many jobs were executed per period, etc.), HOS and fatigue scores (e.g., total hours worked by certain employees within a period, etc.), maintenance (e.g., amount of mechanic hours, amount of replacement vehicle parts, etc.), employment history (e.g., new hire information per period, etc.), critical events, etc. In other embodiments, WATs may not be generated for all stage tables or data within the stage tables. For example, certain historical information within the stage tables may not be aggregated, but instead placed in WATs as is. In various embodiments, the computing device may generate different types of WATs, such as WATs that include summary information, historical information, and detailed information. The various operations for generating WATs are described further below.

In block 212, the computing device may generate prediction information based on the WAT and predefined models, such as simulation models relevant for a particular client entity or business type. For example, the computing device may execute on its processor a predictive modeling engine routine using the generated WAT as an input. Modeling engines may include various equations, calculations, variables, comparisons, and operations that utilize the data within the WAT to predict future activities, occurrences, and conditions of concern to client entities. For example, the computing device may determine a probability of a driver employee encountering a driving accident based on previous driving records represented within the WAT. In various embodiments, the computing device may utilize multiple WATs when performing predictive modeling operations for a client entity, such as by using a WAT having summary information in combination (or cross-referenced) with a WAT having detailed information.

In block 214, the computing device may transmit the generated predicted information to a device associated with a client entity, such as a client entity computer that transmitted the raw client data. For example, the computing device may perform routines to package the prediction information into a report message that may be transmitted to a client computer using Internet protocol transmissions. Such a report may be a periodic transmission (e.g., occurring weekly, monthly, quarterly, etc.), and may be transmitted based on schedule/timing data within the metadata described above in block 205. For example, a client entity may customize the delivery of prediction information so that the computing device transmits reports at times that are most convenient and effective for the client entity's business operations (e.g., a time when the client may immediately address any predictions within the report).

Figure 3:
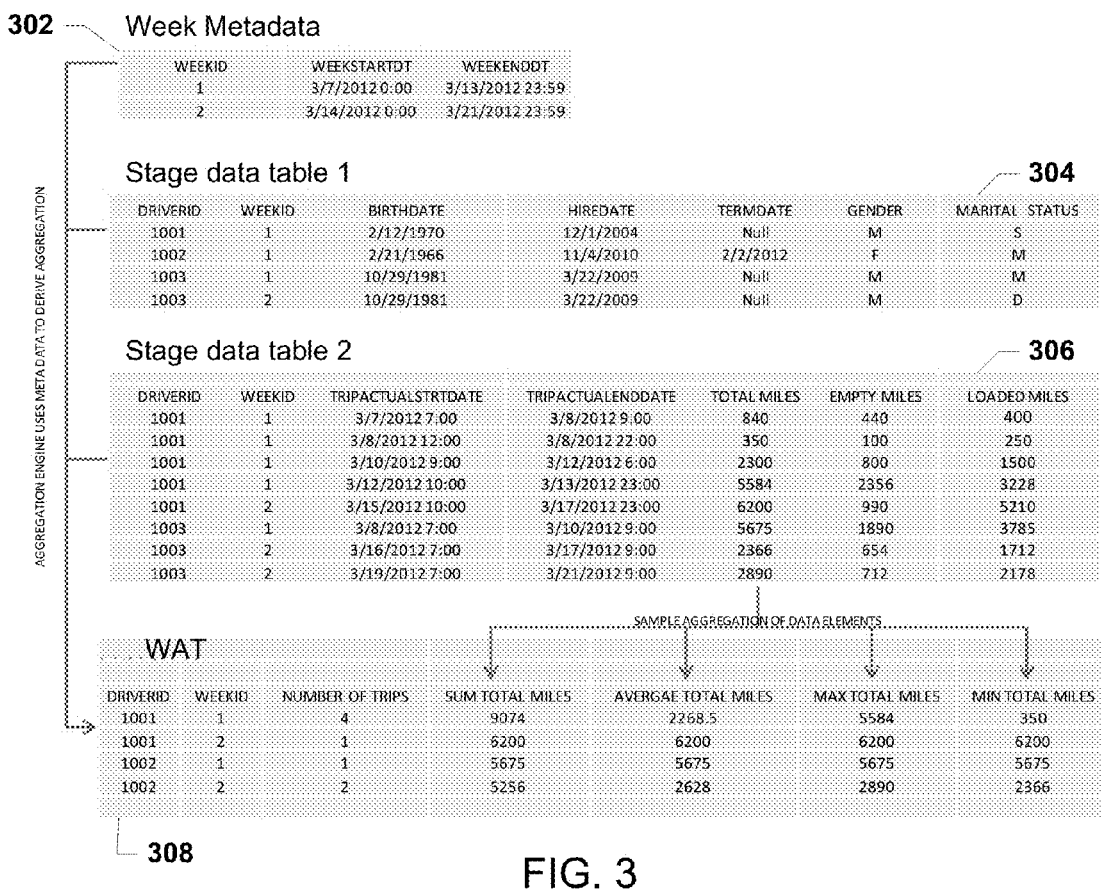
FIG. 3 is a diagram illustrating an exemplary weekly aggregated table suitable for use in various embodiments.

FIG. 3 illustrates an exemplary weekly aggregated table (WAT) 308 suitable for use in various embodiments. As described above, a computing device, such as a service computing device 120, may receive client data from a client entity and obtain metadata that indicates various custom parameters specific to that client entity (or client-specific parameters). In an embodiment, such metadata may be placed within a metadata data table 302. For example, the computing device may generate the metadata data table 302 that includes the start time and stop time (i.e., timeframes) defining the weekly time periods used for aggregating the client data. As described above, the computing device may load client data from flat files into various stage tables that may be related to various functional concerns. For example, client data may be loaded into a first stage table 304 related to employee data and a second stage table 306 related to trip information. The stage tables 304, 306 include data records that represent previous activities, conditions, status, and events over a period. For example, the first stage table 304 may include data columns and data fields that include data representing employee identifiers (e.g., driver IDs), identifiers of a week associated with data records (e.g., week ID), employee birthdates, hire dates, termination dates, gender, marital status, and other personal information. As another example, the second stage table 306 may include data columns and data fields that include data representing the employee identifiers (e.g., driver IDs), the identifiers of a week associated with data records (e.g., week ID), start dates for trips, end dates for trips, the total number of miles for trips, the number miles for trips where an associated vehicle was empty (e.g., no cargo), and the number of miles for trips where the associated vehicle was loaded (e.g., carrying cargo).

The computing device may use the information within the metadata data table 302 to perform aggregation operations with the information in the stage tables 304, 306 to generate a weekly aggregated table (WAT) 308. The WAT 308 may include weekly summaries for each individual record within the client data, such as a weekly summary for each employee (e.g., driver). For example, the WAT 308 may include a summary of the total number of miles, the average number of miles, the maximum total miles, and the minimum total miles that a particular driver employee drove for each week defined in the metadata data table 302.

Figure 4:
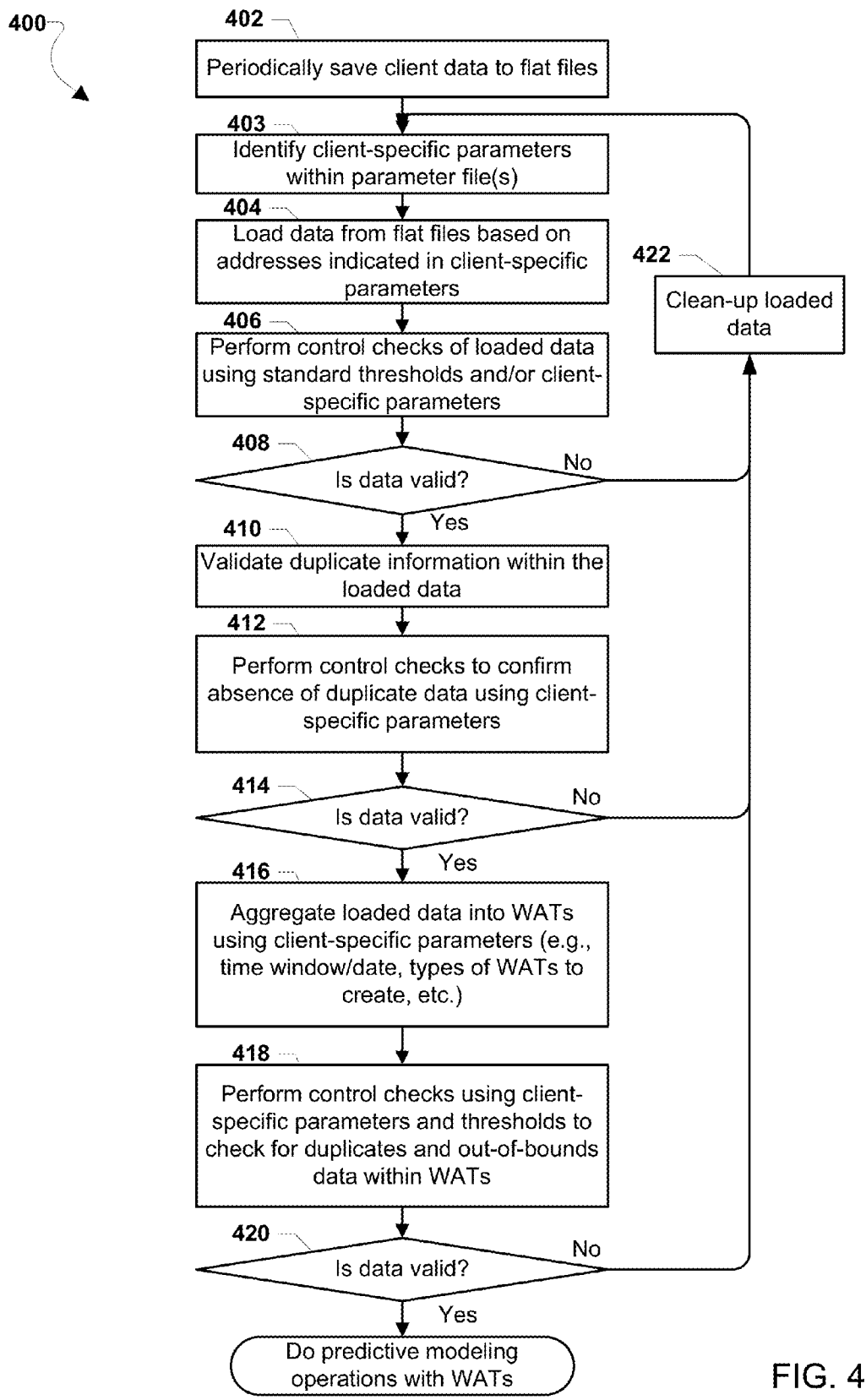
FIG. 4 is a process flow diagram illustrating an embodiment method for a computing device to process client data to generate weekly aggregated tables (WATs) for use with predictive modeling operations.

FIG. 4 illustrates an embodiment method 400 for a computing device to process client data and generate weekly aggregated tables (WATs) for use in predictive modeling operations. The method 400 is similar to the method 200 described above with reference to FIG. 2, except that the method 400 includes more detailed operations for the pre-modeling processing of client data. In general, the computing device may load, check for validity, and aggregate client data prior to performing any predictive modeling. For each of these processes, the computing device may utilize operating parameters, variables, and/or thresholds indicated by client specific parameters, such as parameters within with a configuration file related to a client entity. Based on such client-specific parameters, the computing device may generate WATs that are customized for particular client entities' needs and businesses. In various embodiments, the operations in method 400 may be performed by a service computing device 120 as described above.

In block 402, the computing device may periodically save client data to flat files. For example, the computing device may save client data received in periodic client data runs as flat files within a storage device coupled to the computing device. The operations in block 402 may be similar to the operations in block 204 described above with reference to FIG. 2. In block 403, the computing device may identify client-specific parameters within a parameter file (or parameter files). As described above, parameter files (or client parameter files) may be stored and accessed by the computing device to retrieve customized thresholds and other information provided by client entities. In various embodiments, the client-specific parameters may be identified by the computing device within one or more client parameter files. For example, the computing device may identify client-specific parameters for loading data from flat files into stage tables from a first client parameter file, client-specific parameters for determining data validity from a second client parameter file, and client-specific parameters related to defining aggregation timeframes from a third client parameter file. As described below, client-specific parameters may be used by the computing device for various operations, and thus may indicate information such as a location of a flat file, a beginning and an end of a one-week aggregation period, an overlap period related to client data runs, a number of weeks to aggregate client data, and a type of weekly aggregated table to generate.

In block 404, the computing device may load data from flat files and/or from backend databases based on addresses indicated in the client specific parameters. The computing device may perform operations to read-in, load, convert, and otherwise transfer the client data represented within the flat files (or portions of the client data in the flat files) into stage tables. For example, the computing device may add data records to stage tables in response to reading client data within a flat file. The client-specific parameters identified with the operations in block 403 may indicate the storage locations of all flat files associated with a client entity or alternatively the locations (or addresses) of flat files for a specific time period based on the client-specific parameters. The client-specific parameters may also indicate filenames of flat files associated with the client entity.

In an embodiment, the computing device may convert data from flat files to conform to particular data conventions required by stage data tables. For example, the computing device may perform conversion routines on date (or time) information retrieved from flat files prior to loading that date information into a stage table. In various embodiments, the client-specific parameters may indicate different types and/or amounts of flat files to load for different client entities. For example, a first client entity may be associated with a flat file related to driver statistics client data and another flat file related to fuel statistics client data, whereas a second client entity may only be associated with a flat file related to employment records client data.

In block 406, the computing device may perform control checks of the loaded data using standard thresholds and/or client-specific parameters. In particular, the computing device may analyze data records loaded within the stage tables to identify whether particular data (or data type) is missing, whether data conforms to acceptable min/max values for particular data fields, and whether data meets freshness thresholds (e.g., is stage table data too old?). For example, the computing device may check loaded stage table data records to determine whether any records have a creation date that exceeds date thresholds defined within the client-specific parameters. Standard thresholds may include maximum date thresholds for the various data types, such as a creation date threshold that is within a certain number of weeks of a current date (e.g., the date the computing device loads the stage tables, the date the client data run is performed, etc.).

In an embodiment, the computing device may evaluate all loaded data within the stage tables to determine whether there is a valid (e.g., not null) value for each record. For example, when a data record has an empty 'ClientID' field, the computing device may determine (or mark) that record invalid. As another example, the when a data record does not provide required information for a particular data table field, the computing device may adjust that data record to include default or placeholder information (e.g., a '9999' value may be stored an empty field). In various embodiments, the computing device may enter null values into stage table data fields when the flat files do not represent properly formatted data, such as date information that cannot be converted to a known date standard format. In other embodiments, the computing device may evaluate data records in the stage tables to determine whether null values exist, whether date values exceed predetermined date values (e.g., system dates), whether numeric data fields have the appropriate sign (e.g., is a number negative when the data field requires data to be positive?), whether unknown identifier codes are represented in data fields, etc. In an embodiment, the computing device may perform operations to count the number of valid data records (or lines) within each flat file indicated in client-specific parameters and may compare the count to the number of data records stored within the corresponding stage table to confirm the validity of the stage table.

In determination block 408, the computing device may determine whether the data is valid, such as the client data loaded into the stage tables. The computing device may make this determination based on various factors, such as results of the control check operations described above, by operations that may determine whether data is missing, whether flat files are missing, whether the amount of data loaded into stage tables is less than a threshold amount (e.g., loaded data represents a number of days that is below the required number of days of data, etc.), whether loaded data is the same as data loaded in a prior run (i.e., the loaded data is not new), and by operations that may determine whether the computing device encountered an error when attempting to load data into the stage tables. In other words, the computing device may determine whether the data is not valid when it detects anomalies or other problematic conditions during or after loading the stage tables.

If the data is determined to not be valid (i.e., determination block 408="No"), the computing device may clean-up loaded data in block 422, such as by removing old data from stage tables. In an embodiment, the computing device may simply perform operations that invalidate or otherwise adjust the data within the stage tables to indicate that data is not valid. In various embodiments, cleanup operations may or may not be automated, and thus the computing device may be configured to transmit messages indicating that new files need to be acquired and loaded via the computing device. For example, the computing device may transmit a notification message indicating that human operators accessing the computing device should obtain and install a new file with uncorrupted client data. In an embodiment, the computing device may perform operations to request the download of the client data from client entity computers. For example, when the stage table loaded data is determined to be invalid, the computing device may transmit to a client entity server via the Internet a notification message that indicates a client data run needs to be downloaded again due to corrupted or missing data, thus prompting additional input or actions from human operators associated with the computing device and/or the client entity server. Once the stage tables are emptied or otherwise reset, the computing device may start again with new data with the operations in block 403.

In an embodiment, any data within stage tables that is removed or otherwise rejected may be written to or summarized within logs by the computing device (e.g., error logs). In another embodiment, the computing device may transmit notifications in response to determining the data is not valid. For example, the computing device may transmit a report message that indicates stage table data is invalid and must be re-loaded. Such notifications may be transmitted to various devices associated with interested parties, such as computers utilized by system administrators and/or client entities.

However, if the data is valid (i.e., determination block 408="Yes"), in block 410 the computing device may validate duplicate information within the loaded data. The computing device may analyze the data within the stage tables to identify any duplicate records, such as multiple records that contain the exact same data field values. In various embodiments, the computing device may evaluate data records that correspond to overlapping dates (i.e., overlapping data) to determine whether duplicates exist and whether such duplicates should be invalidated. Various operations for validating duplicate data are described below.

In block 412, the computing device may perform control checks to confirm the absence of duplicate data using client-specific parameters. As the stage tables are multi-tenant (i.e., include data records for numerous client entities), the computing device may use an identifier or unique code associated with a particular client entity related to the client data that is indicated within the client-specific parameters to confirm that duplicate data records have been properly removed (or marked as invalid) within the stage tables. For example, the computing device may identify the data records associated with a current client entity using a client identifier as a look-up key on the stage tables, and may evaluate the related data records to confirm that no data records are redundant or duplicated.

In determination block 414, the computing device may determine whether the data is valid. The operations in determination block 414 may be similar to the operations in determination block 408 described above. In an embodiment, the computing device may analyze rejected records to confirm the invalidity of those rejected records (e.g., data records marked as duplicate or invalid may be double-checked using the same operations). If the data is determined to not be valid (i.e., determination block 414="No"), the computing device may continue with the operations in block 422.

If the data is determined to be valid (i.e., determination block 414="Yes"), in block 416 the computing device may aggregated the loaded data into WATs using client-specific parameters, such as time windows or dates and/or definitions of what stage table data to use when aggregating data. The WATs may include descriptions, summaries, or other consolidated information for particular elements that are organized on a weekly basis. For example, a WAT may include the average trip times for each individual driver in a trucking company for each week within a certain time frame. The client-specific parameters may indicate the types of WATs to generate, the number of weeks of data to aggregate into WATs (e.g., 9 weeks, 52 weeks, all the way to the beginning), as well as any dates or date ranges associated with data that should be re-aggregated. The aggregation and WAT generation operations are described further below.

In block 418, the computing device may perform control checks with client-specific parameters and thresholds to check for duplicates and out-of-bounds data within WATs. Such control checks may serve to determine when calculations of the aggregations, or the stage table data itself, are erroneous or unacceptable. In particular, the thresholds may include values that represent universal or generic limits or thresholds for acceptable values of data within the WATs. For example, the thresholds may include values that define the range of numeric values that values within a particular aggregation field may be without being incorrect. The client-specific parameters may also indicate ranges of values that WAT data should adhere to, including out-of-bounds values that may demarcate values that are erroneous or alternatively so unlikely that additional calculations should be triggered to confirm such values. For example, the client-specific parameters may provide thresholds that indicate that no WAT table should include data showing an employee as having been hired prior to a certain data (e.g., the date of the start of operations of the client entity). As another example, the client-specific parameters may indicate the total number of trips that a driver employee may make in a given week. Additionally, the thresholds and client-specific parameters may provide instruction for the computing device for confirming the absence or presence of duplicate data records within the WATs. The client-specific parameters may indicate rules or patterns that may be used by the computing device to evaluate whether WAT data records are duplicates of each other. For example, the computing device may use the client-specific parameters to detect that two subsequent data records within a WAT are duplicates based on the data records having similar employee identifiers. In an optional embodiment, the thresholds may indicate immutable laws, such as the total number of days in a week or the total number of hours in a work day. In another embodiment, the client-specific parameters may indicate which checks the computing device should perform for various WATs. For example, based on the client-specific parameters, the computing device may not perform control checks regarding vacation data when the related client entity does not provide vacation data for aggregation into WATs. In an embodiment, the control checks may also include operations that confirm or replicate transformations of data from stage tables into WATs (e.g., aggregation operations may be simulated to confirm correctness).

In determination block 420, the computing device may determine whether the data is valid, such as the data within the WAT tables. In particular, the computing device may analyze the data in the generated WATs compared to the data in related stage tables to detect whether the WATs include data that has not been aggregated (or re-aggregated). The computing device may further determine whether all stage table data was utilized to generate the WATs, analyzing WAT data records and data fields to detect whether certain data elements of the various stage tables were omitted. If the data is valid (i.e., determination block 420="Yes"), the computing device may continue with predictive modeling operations using the generated WATs, such as by performing the operations in blocks 212-214 described above with reference to FIG. 2. If the data is not valid (i.e., determination block 420="No"), the computing device may continue with the operations in block 422, such as by transmitting a notification message indicating that valid client data is required.

Figure 5:
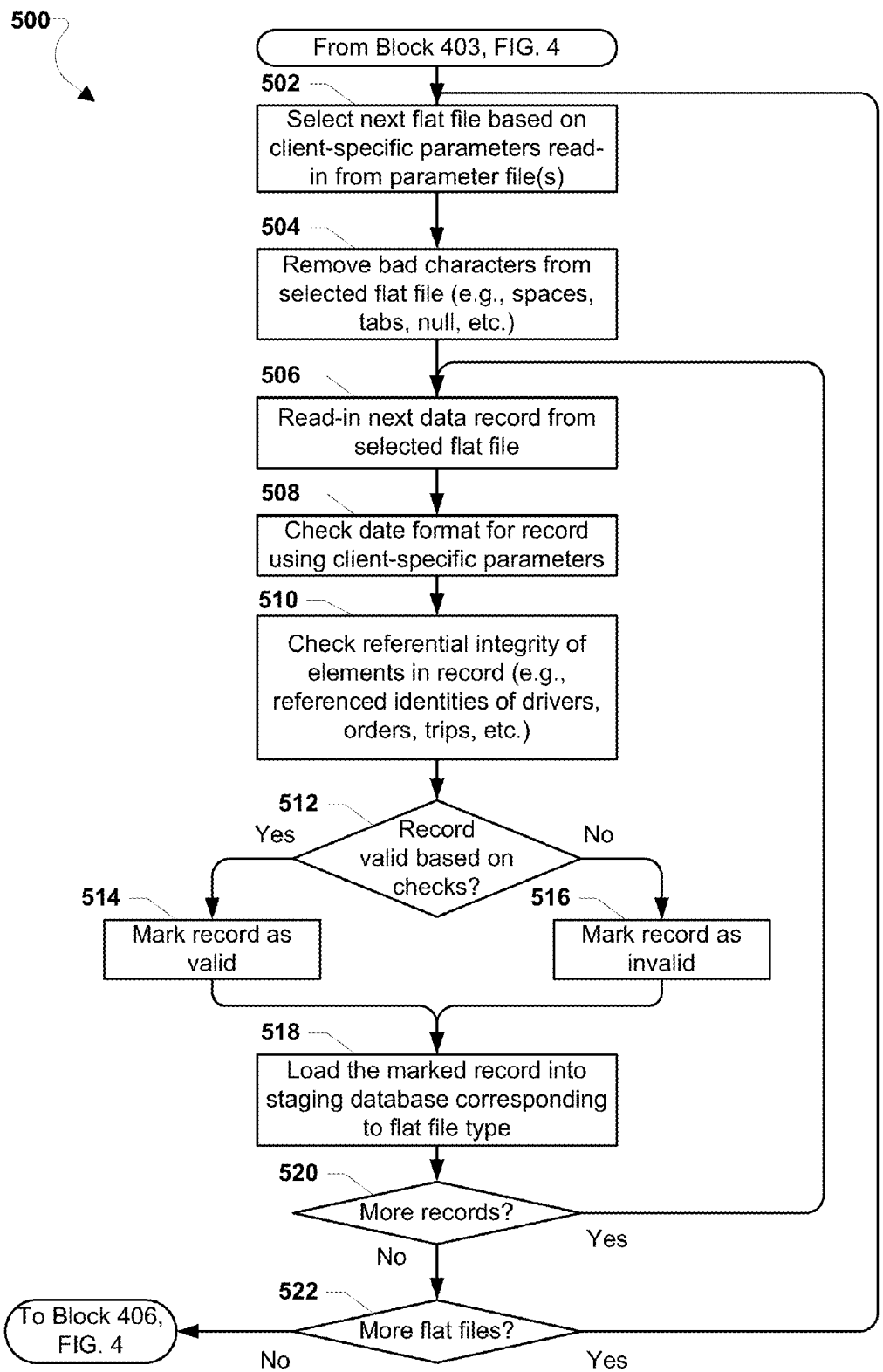
FIG. 5 is a process flow diagram illustrating an embodiment method for a computing device to load client data into stage tables.

FIG. 5 illustrates an embodiment method 500 for a computing device to load client data into stage tables. As described above, client data received from a client entity (e.g., periodic downloads of data via the Internet) may be stored by a computing device and loaded into stage tables for use in aggregation operations. For example, a stage table may include data from a flat file stored in response to a client data run. In an embodiment, the method 500 may include operations similar to the operations in block 206 of FIG. 2 and/or the operations in block 404 of FIG. 4. In other words, the operations in the method 500 may be performed by a computing device during the execution of the methods 200 or 400 described above. For example, a service computing device 120 may perform the operations of the method 500 in place of the operations of block 206 of the method 200 described above.

In block 502, the computing device may select a next flat file based on client-specific parameters read-in from parameter files. As described above, the computing device may read-in parameters from one or more files associated with a client entity, such as with the operations in block 403. Such client-specific parameters may include the addresses and file names of flat files that may be loaded in stage tables. In an embodiment, the first time the operations in block 501 may be performed by the computing device, the next flat file to be selected may be the first flat file indicated by the client-specific parameters. In various embodiments, the computing device may select a different flat file for different types of data and/or different types of WATs that may be eventually generated (e.g., a first flat file for trip data, a second flat file for order data, etc.).

The computing device may prep or otherwise perform initial processing of the information within the selected flat file. Accordingly, in block 504, the computing device may remove bad characters from the selected flat file. For example, the computing device may perform routines that remove spaces, tabs, nulls, and other useless data or errata. Such bad characters may be standardized for any client entity. In various embodiments, the computing device may perform other preparatory operations, such as confirming the number of records represented in the flat file.

In block 506, the computing device may read-in a next data record from the selected flat file. For the first iteration, the next data record may be the first data record within the selected flat file. The computing device may translate or otherwise convert the information within the selected flat file into data table values within stage tables. In various embodiments, the read-in operations performed by the computing device may include loading data record information into a buffer or other temporary storage device or memory location that the computing device may access prior to loading the data into a stage table. In block 508, the computing device may check the date format for the record using the client-specific parameters. For example, the computing device may identify any dates represented in the read-in data record and may detect any dates that do not conform to a certain configuration. The computing device may evaluate dates within the data record, and may validate or invalidate the data record when any dates of the data record do not conform with known or predefined date formats (i.e., the computing device may not recognize non-conforming data). In various embodiments, valid date formats may include the following: 'YYYY-MM-DD', 'YYYY-MM-DD HH:MI:SS AM', 'YYYY-MM-DD HH24:MI:SS', 'YYYYMMDDHH24MI', 'MM/DD/YYYYHH24MI', 'YYYYMMDDHH24MISS', 'YYYYMMDD', 'MM/DD/YYYY', 'MM/DD/YYYY HH:MI:SS AM', 'MM/DD/YYYY HH24:MI:SS', 'DD-Mon-YYYY', where 'HH' stands for a number of hours in a time of day that is represented in a 12-hour format, where 'HH24' stands for a number of hours in a time of day that is represented in a 24-hour format, where 'MI' stands for a number of minutes in a time of day, where 'SS' stands for a number of seconds in a time of day, where 'M' stands for a numeral of a month (e.g., MM may be '08' to represent the month of August), 'Y' stands for a numeral of a year (e.g., YY may be '13' to represent the year 2013), and 'D' stands for a numeral of a day (e.g., DD may be '03' to represent the third day in a month). In various embodiments, the computing device may also be configured to convert date elements within the record to conform with recognized, approved, or otherwise acceptable date formats.

In block 510, the computing device may check the referential integrity of elements in the record. The computing device may execute the referential integrity checks the same for any client entity (or client data) and thus may not require client-specific parameters. For example, the computing device may compare any identifiers indicated within the read-in data record (e.g., the unique code for a particular employee, an order, a trip, etc.) to a list of identifiers known to the computing device. As another example, the computing device may compare data record identifiers to lists of driver identifier codes indicated within a client-specific file associated with a particular client entity. In this way, the computing device may detect erroneous, unauthorized, or otherwise incorrect data.

In determination block 512, the computing device may determine whether the record is valid based on the checks, such as the operations described above with reference to blocks 508-510. For example, if the record includes an identifier that is not indicated within the client-specific parameters and/or a date that is not formatted in a recognized format type, the record may be invalid. If the record is determined to be valid based on the checks (i.e., determination block 512="Yes"), in block 514 the computing device may mark the record as valid, such as by changing, updating, or storing a bit, code, or data field value that is associated with the record and that may be utilized by the computing device when processing stage tables. If the record is not determined to be valid based on the checks (i.e., determination block 512="No"), in block 516 the computing device may mark the record as invalid. In an embodiment, the computing device may add descriptive information, such as a special code or identifier, to the record to indicate the basis or reason for determining invalidity. For example, the computing device may change the record to include a code representing a date violation, a referential data violation, etc. In various embodiments, the computing device may save (or store) information related to invalid records, such as by storing the invalid records within an archive file or folder, and further may generate reports that indicate the invalid records. Such reports may be transmitted to devices utilized by administrators, users, and/or clients.

In block 518, the computing device may load the marked record into a staging database (or data table) corresponding to the flat file type. For example, the computing device may bulk load the marked data record into a stage table that corresponds to employee data.

In determination block 520, the computing device may determine whether there are more records within the flat file to process. If there are more records to process (i.e., determination block 520="Yes"), the computing device may continue with the operations in block 506 by reading in the next data record. This operational loop may be performed until all records of the selected flat file are processed. If there are no more records to process (i.e., determination block 520="No"), in determination block 522 the computing device may determine whether there are more flat files to process. In other words, the computing device may determine whether it has processed all the flat files indicated by the client-specific parameters. If there are more flat files (i.e., determination block 522="Yes"), the computing device may continue with the operations in block 502. If there are no more flat files (i.e., determination block 522="No"), the computing device may continue with the operations in block 406 of FIG. 6. For example, the computing device may perform checking operations to verify the validity of the data loaded into stage tables from the flat files. In an embodiment, once the raw client data from a flat file is loaded into a staging table, the computing device may execute a script, routine, or other software instructions to flag or mark data records that fail to pass the checks of the operations in blocks 508-510.

Figure 6:
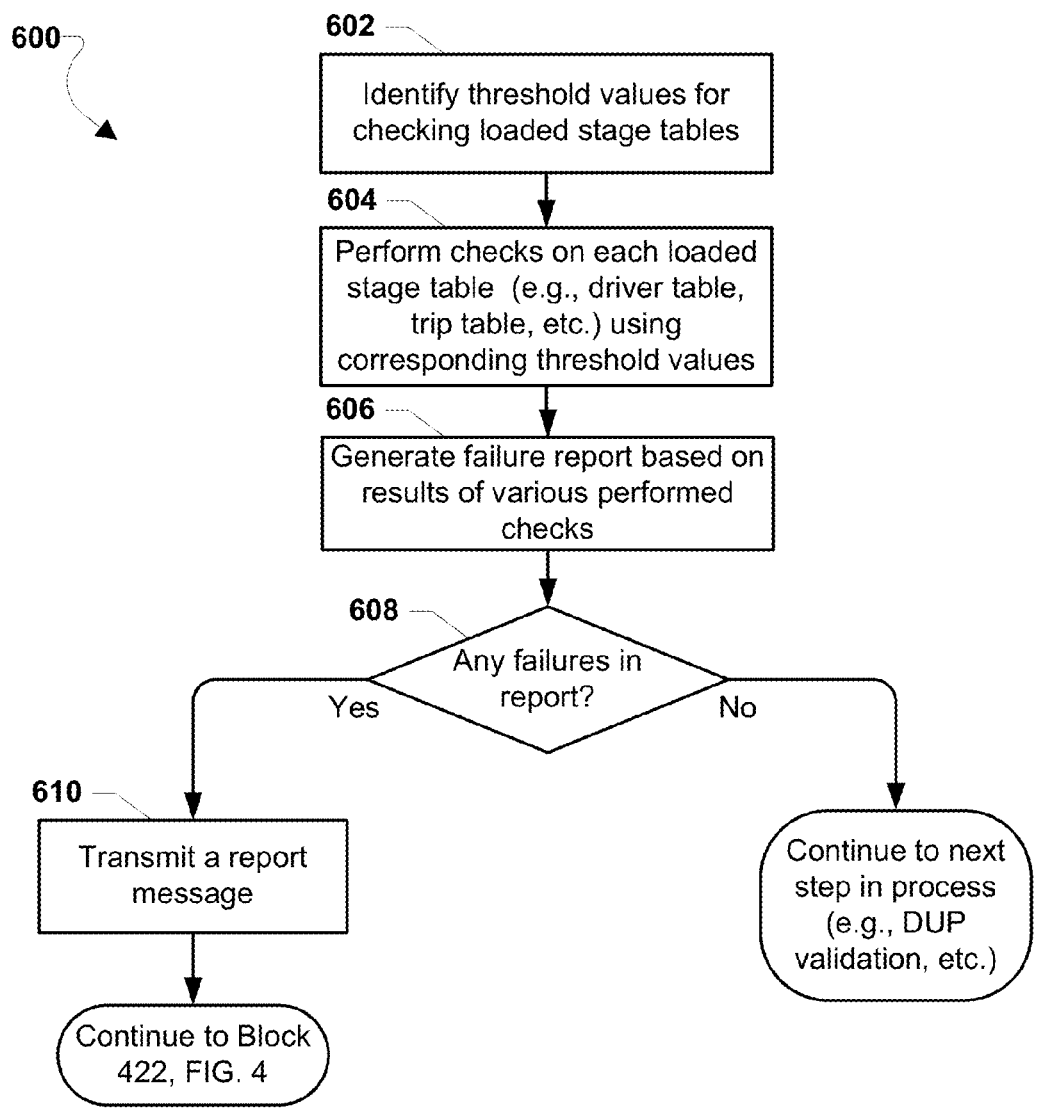
FIG. 6 is a process flow diagram illustrating an embodiment method for a computing device to determine whether failures occur during the loading of client data into stage tables.

FIG. 6 illustrates an embodiment method 600 for a computing device to determine whether failures occur during the loading of client data into stage tables. The method 600 may be performed by the computing device to confirm the validity of data within loaded stage tables. In an embodiment, the computing device may perform the operations of the method 600 in place of the operations of block 406 of the method 400 described above. In various embodiments, the method 600 may be performed by a service computing device 120 as described above. In other embodiments, various operations of the method 600 may also be performed by the computing device in place of the operations in determination blocks 408 and 414 of the method 400 described above with reference to FIG. 4.

In block 602, the computing device may identify threshold values for checking loaded stage tables, such as threshold values read-in from a client-specific file as described above. In particular, the computing device may identify testing threshold values and other testing conditions that correspond to individual stage table and/or client data with stage table. For example, the computing device may identify a first threshold value for data values within a stage table related to losses of a business and a second threshold value for data values within another stage table related to employee information of the business.

In block 604, the computing device may perform checks on each loaded stage table (e.g., driver stage table, trip stage table, service failure stage table, loss stage table, etc.) using the corresponding threshold values. For example, based on the client-specific parameters related to driver data for a client entity, the computing device may confirm the validity of driver data values within fields of the driver staging table. In an embodiment, the checks may be performed by the computing device by executing SQL queries that may results in pass or fail information (e.g., an empty query result may indicate a pass of a certain test). In block 606, the computing device may generate a failure report based on the results of the various performed checks. Such reports may include descriptions, codes, identifiers, and other information indicating any data records and/or stage tables that include invalid or otherwise unacceptable data based on the thresholds. The reports may also include information indicating the various stage tables that were checked, as well as whether each performed check passed or failed.

In determination block 608, the computing device may determine whether there are any failures in the report, such as any codes that indicate the results of a SQL query of a stage table. If any failures are in the report (i.e., determination block 608="Yes"), in block 610, the computing device may transmit a report message, such as an alert notification that may cause the computing device to re-load flat file information and/or request client data from a computer associated with a client entity. The computing device may then continue with the operations in block 422 as described above with reference to FIG. 4. In an embodiment, if there is a failure, the computing device may exit or suspend the method 400 and wait for subsequent inputs from an operator before continuing to process client data. For example, the computing device may be configured to rely on manual intervention to resolve an encountered failure, such as manual retrieval of a new flat file for reloading operations on the computing device and/or manual inputs detected by the computing device that confirm or reject the validity of the encountered failure. If there are no failures in the report, the computing device may be configured to continue with the processing of the stage tables. For example, the computing device may perform validation operations as described above with reference to the block 410.

Figure 7A:
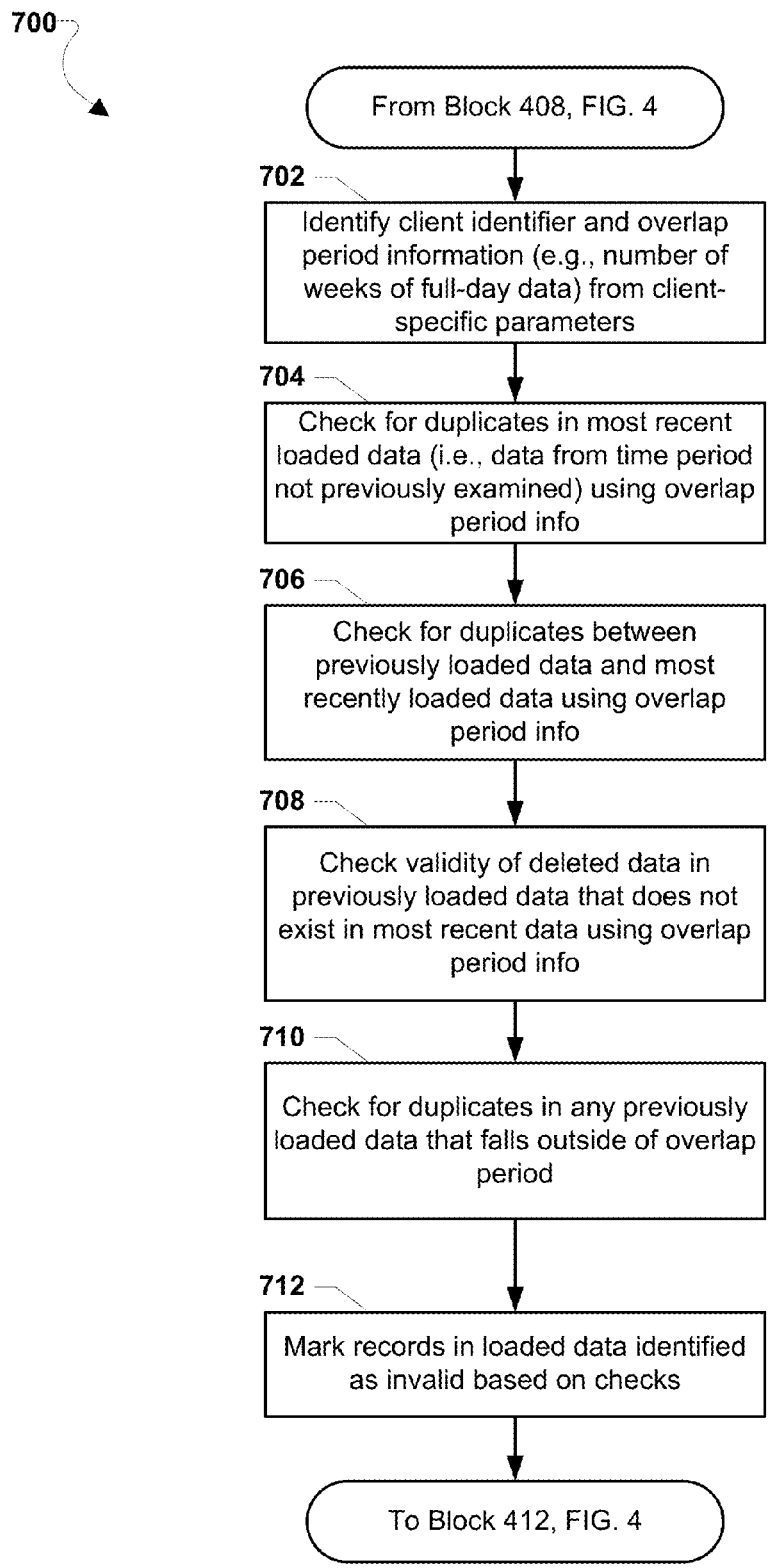
FIG. 7A is a process flow diagram illustrating an embodiment method for a computing device to perform validity checks on client data loaded into stage tables.

FIG. 7A illustrates an embodiment method 700 for a computing device to perform validity checks on client data loaded into stage tables. As described above, the computing device may receive and process client data received in a plurality of client data runs. In other words, the computing device may periodically receive new loads of client data, such as once every month. However, each run of new client data may include overlapping data to avoid losing information in between runs. For non-limiting illustration purposes: if a client entity transmits client data to the computing device in the morning on the same day of each month, client data that is collected in the afternoon of the day of these transmissions may be missed if overlapping data is not transmitted in each client data run. So, to ensure client data is not missed, client data runs may include duplicate data in overlap periods.

However, duplicate data may result in inaccurate or simply incorrect predictions when used by the computing device within WATs. For example, duplicate data records related to a particular employee's daily progress (e.g., number of hours driving on a hauling trip, etc.) may cause aggregations to show higher progress than actually occurred. To avoid the negative impact of duplicate information within data of overlapping periods, the computing device may perform various checks to invalidate data records in stage tables that are duplicates, redundant, or otherwise unneeded.

In an embodiment, the operations in the method 700 may be performed by the computing device in place of the operations in block 208 in method 200 as described above with reference to FIG. 2 and/or in place of the operations in block 410 in method 400 as described above with reference to FIG. 4. Accordingly, in an embodiment, the operations in the method 700 may be performed by the computing device after performing the operations in determination block 408 of the method 400.

In block 702, the computing device may identify client identifier and overlap period information from client-specific parameters, such as the parameters read-in with the operations in block 403 described above with reference to FIG. 4. Since the stage tables may be multi-tenant, the client identifier may be used to identify data tables within stage tables that are relevant to a particular client entity. Further, the overlap information may define the customized dates that the particular client entity has established for transmitting client data for processing by the computing device. For example, the overlap information may indicate the number of weeks within a load of client data that include full-day information. As indicated above, based on when client data is transmitted, client data loads may not include full-day client data. So, the overlap period information may be used by the computing device to identify potentially missed data occurring within an overlap period (e.g., within a half-day period).

The operations in blocks 704-710 may be referred to as validation operations and may be performed by the computing device to identify duplicate or unneeded data records that should be invalidated prior to aggregation operations. In block 704, the computing device may check for duplicates in the most recent loaded data using the overlap period information. The operations in block 704 may be referred to as "duplicate validation" operations. In particular, the computing device may use the client-specific parameters to determine the stage table data that corresponds to the most recently received client data from a certain client entity, such as the loaded data from that latest client data run. For example, the computing device may identify stage table data records that correspond to a time period (e.g., last four weeks) that was not previously evaluated. The computing device may evaluate the data records of the most recently loaded data to identify duplicates, such as by comparing the values of data fields within the data records to identify matches. In an embodiment, the computing device may identify duplicates by comparing data records loaded from the same flat file (e.g., driver records from a driver data flat file, loss records from a loss data flat file, etc.).

In block 706, the computing device may check for duplicates between previously loaded data (or previously processed data, such as data records within stage tables associated with previous client data runs, and most recently loaded data (or a most recent portion of received client data) using the overlap period information. The operations in block 706 may be referred to as "overlap validation" operations. In particular, based on the overlap period information from the client-specific parameters, the computing device may identify any duplicate data records corresponding to the overlap time period. The computing device may identify duplicate data records occurring in the overlap period based on matching values in data fields of data records from different client data runs. For example, the computing device may identify duplicate data records including the same data field values and that were loaded from flat files associated with the previous month's client data run and the current month's client data run. The overlap period may include several days (or weeks) of reported client data, and thus the computing device may identify numerous data records that have been loaded into stage tables more than once. In an embodiment, the computing device may be configured to invalidate duplicate data records from older client data runs (i.e., the most recent data records may be maintained for the purposes of aggregating).

In block 708, the computing device may check the validity of deleted data in previously loaded data that does not exist in the most recent loaded data using the overlap period information. The operations in block 708 may be referred to as "delete validation" operations. In other words, the computing device may identify data records within the overlap period that exist in the older client data but not in the most recent client data. This case may occur when the client entity providing the client data purposefully removes data records in between client data run due to error or other administrative reason. For example, trip data that was received by the computing device in a previous client data run (e.g., last month's load of client data) may not be included in a current client data run (e.g., this month's load of client data). Invalidating such removed data records may ensure that erroneous data records are not propagated in future aggregation operations and predictive modeling exercises.

In block 710, the computing device may check for duplicates in any previously loaded data that falls outside of the overlap period. The operations in block 710 may be referred to as "clean-up validation" operations. In other words, the computing device may perform checks that ensure data records outside of an overlap period are not duplicated within stage table data corresponding to different client data runs. This may be valuable when previous loaded data includes data records corresponding to a half-day that occurred outside of the overlap period described in the client-specific parameters. For example, an overlap period may be defined to start on a Tuesday, but both a previous client data run and a most recent client data run may include data from Monday afternoon.

In block 712, the computing device may mark any records in the loaded data identified as invalid based on the checks, such as by changing a data field value, bit, or other data related to the invalid data records. In an embodiment, the computing device may utilize various codes or indications for marking the data records, such as a unique code for invalidity basis corresponding to any of the checks in the operations in blocks 704-710. Such unique encoding/marking may be valuable when the computing device transmits validity reports for use by administrators, users, or client entities so that they may better understand why certain data records were not utilized by the computing device during aggregation operations. In an embodiment, the computing device may continue with the operations in determination block 414 after executing the operations in block 712. In various embodiments, the computing device may not delete or otherwise dispose of invalid or duplicate data records, but instead may continue to store such records in data tables and/or files along with any corresponding invalid marks, information, or encodings.

In various embodiments, the computing device may execute SQL update statements to perform the various checking operations of the method 700. Such SQL update statements may be configured to be generic enough for using with a multi-tenant stage table, but flexible enough to define different overlapping periods customized to particular clients. Examples of such SQL statements are found in FIGS. 7F-7I and FIG. 8B.

Figure 7B:
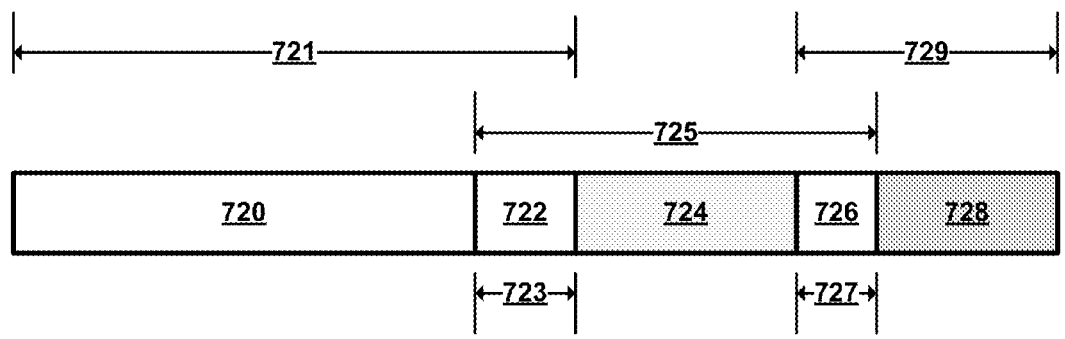
FIGS. 7B-7C are diagrams illustrating exemplary overlapping periods corresponding to various client data runs.

FIG. 7B illustrates exemplary overlapping periods corresponding to various client data runs. As described above, a computing device, such as a service computing device 120, may load client data into stage tables in response to periodically receiving the client data in various runs, such as a run per month(s). To avoid missing data (or having any gaps in the data), data within each client data run may include data that has been previously received by the computing device.

For non-limiting illustration purposes: an initial client data run may include sets of data records 720, 722 corresponding to a first period 721. For example, the first period 721 may be a three-year period (e.g., Jan. 1, 2009 through Jan. 1, 2012). A second client data run may include sets of data records 722, 724, 726 corresponding to a second period 725. For example, the second period 725 may be a six-month period (e.g., Dec. 1, 2011 through Jun. 1, 2012). A third client data run (or most recent) may include sets of data records 726, 728 corresponding to a third period 729. For example, the third period 729 may be a two-month period (e.g., May 1, 2012 through Jul. 1, 2012). The various sets of data records 720, 722, 724, 726, 728 may include arbitrary numbers of individual data records. The computing device may be configured to perform the method 700 described above to invalidate duplicate data records received in any of the various client data runs. In particular, the computing device may perform checks to invalidate duplicate data records occurring within the overlapping periods 723, 727 to ensure that duplicates do not get aggregated into WATs.

Figure 7C:
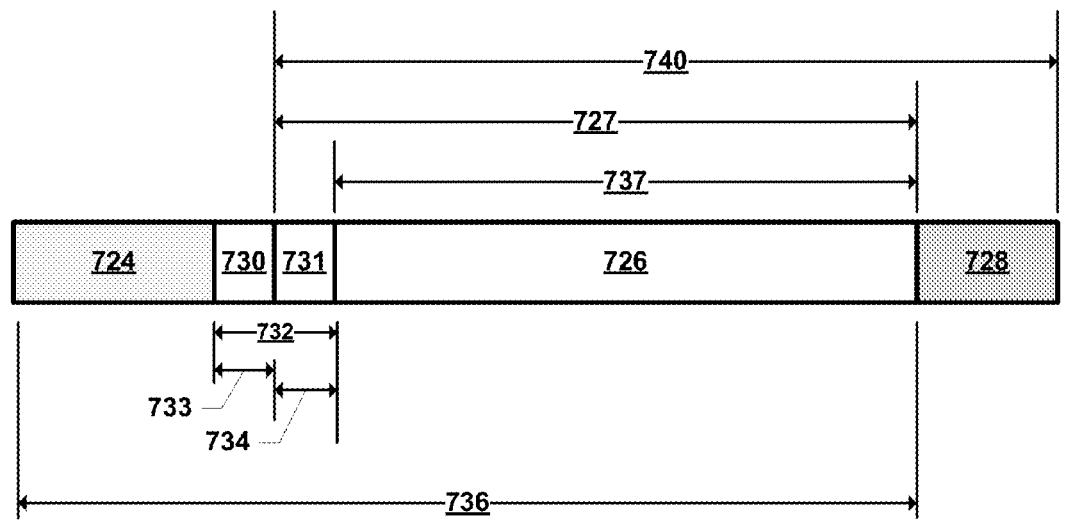

FIG. 7C illustrates a detailed exemplary overlapping period corresponding to various client data runs. As described above, a computing device may load client data into staging tables from numerous client data runs. For non-limiting illustration purposes: sets of data records 724, 730, 731, and 726 may correspond to a second client data run corresponding to a third period 736 and sets of data records 731, 726, and 728 may correspond to a third client data run corresponding to a first period 740. The sets of data records 731, 726 may correspond to an overlapping period 727 (i.e., the period for which the second and third client data runs have provided the same data). The various sets of data records 724, 726, 728, 730, 731 may include arbitrary numbers of individual data records. The overlapping period 737 may correspond to an overlap period that includes full days of data (i.e., the overlapping period 737 does not include data collected from a partial or half day). The sets of data records 730 and 731 may correspond to a single day period 732 of data collection (e.g., a Monday). The set of data records 730 may correspond to a first half-day period 733 of data collection (e.g., data from 12 AM-11:59 AM on Monday), and the set of data records 731 may correspond to a second half-day period 734 of data collection (e.g., data from 12:00 PM-11:59 PM on Monday). The third client data run may only include the set of data records 731 and not the set of data records 730 based on the client-specific parameters that define the schedule of data runs and related aggregation. In other words, the second client data run may include both data records 730 and 731 (i.e., a full day of data) as the second client data run was configured to report data starting before and ending after the single day period 732; however the third client data run may only include data record 731 as the third client data run was configured to report data starting after the first half-day period 733 (i.e., starting in the middle of the single day period 732 to only include the second half-day period 734).

Configured to perform the method 700 described above, the computing device may perform the operations described above with reference to block 704 (i.e., "duplicate validation" operations) with the sets of data records 731, 726, 728 that correspond to the first period 740. The computing device may perform the operations described above with reference to blocks 706-708 (i.e., "overlap validation" operations and "delete validation" operations) with the set of data records 726 that corresponds to the overlapping period 737 (i.e., only check for duplicate data records within the overlapping period of full days). The computing device may perform the operations described above with reference to block 710 with the sets of data records 724, 730, 731, 726 that correspond to a third period 736 (i.e., check for duplicate data records that may occur outside the overlapping period).

In an embodiment, the computing device may identify the sets of data records 730, 731 by using client-specific parameters, such as parameters that indicate the total number of weeks with full days of data and the day of the week/month that client data runs were executed. The computing device may use the client-specific parameters in combination with particular data table columns and/or data fields to identify data records that correspond to overlapping periods. For example, the computing device may evaluate a "created date" data field within a data record to identify whether that data record corresponds to an overlap period indicated in client-specific parameter information. Additionally, the client-specific parameters and data field values of data records may also be used by the computing device to identify those data records that correspond to full and half days within overlapping periods.

FIGS. 7D-7E illustrate an exemplary stage table 790 that includes data records that may be checked for validity by a computing device. The stage table 790 may include various data columns 750-756, such as a first data column 750 having data record identifiers, a second data column 751 having created date values (e.g., the date the data record was generated by a client entity), a third data column 752 having reference identifiers (e.g., employee numbers, names, social security numbers, etc.), a fourth data column 753 having event date values (e.g., hiring date, date of an accident, etc.), a fifth data column 754 having client data run identifiers (i.e., indicating to which client data run each data record corresponds), and a sixth data column 756 having values indicating whether the data records are valid or invalid. The stage table 790 may also include various data records 760-779 that were received and loaded by a computing device in two client data runs (i.e., runID '1' and runID '2'). In particular, the data records 760-766 were received by the computing device in a first, older client data run and the data records 770-779 were received in a second, more recent client data run (as shown by the fifth data column 754 values for each record). Further, the computing device may also utilize the second data column 751 to identify which data record to invalidate when duplicates are discovered. In particular, when two data records are the same, the data record having the older date in the second data column 751 data field may be invalidated.

FIG. 7D shows the stage table 790 as it may exist prior to the computing device performing the method 700 described above. In other words, the values in the sixth data column 756 may all indicate that the corresponding data records 760-779 are valid (i.e., 'Y'). FIG. 7E shows the stage table 790 after the computing device performed the method 700. For example, the computing device may find duplicate records within a most recent client data run, in an overlap period between two subsequent runs, data records in the oldest client data but not within the most recent data, and data records in a previous client data run that also appear in a later or more recent client data run without restriction to an overlap timeframe.

For the purpose of non-limiting illustration: the computing device may mark the data field 785 of a first data record 778 as invalid (i.e., 'N') as both data records 778 and 779 share the same information and are related to the same client data run. Based on customized client-specific parameters (e.g., parameters in metadata tables indicating a client's preferred overlap period duration in weeks, etc.), an overlap period may be identified by the computing device as being between Jun. 19, 2012 and Aug. 14, 2012. The computing device may compare the date values within the data fields of the fourth data column 753 to the identified overlap period in order to determine whether individual data records correspond to the overlap period. Accordingly, the computing device may mark the data fields 781, 782, and 784 as invalid as the corresponding data records 763, 764, 766 are duplicates of the more recent data records 771, 772, 773 that occur in an overlap period. In other words, the computing device may invalidate previous client data run's duplicate data records when they are also in the latest client data run's data records and correspond to an overlap period. The computing device may also mark the data field 783 as invalid because the corresponding data record 765 was reported in the previous client data run (i.e., run ID "1") but not the most recent client data run (i.e., run ID "2"). This may ensure a data record 765 that was originated by the client entity in error for the previous client data run (i.e., run ID "1") doesn't continue to propagate in subsequent aggregation operations. The data field 780 of the data record 762 may be invalidated by the computing device as well as the data record 762 is a duplicate of the data record 770. The data record 761 may not be marked invalid by the computing device because there may not be a full set of client data for Jun. 18, 2012 (i.e., Jun. 19, 2012 is the first full day of client data known to be within the overlap period of the illustration).

In various embodiments, the computing device may invalidate the various duplicate records using various codes, identifiers, notes, and other information that may be transmitted to users or administrators. For example, the computing device may utilize descriptive language codes, such as "Delete" for records invalidated when removed from subsequent client data runs, "Overlap" for records invalidated when occurring in multiple client data runs and within an overlap period, "CleanUp" for records invalidated when occurring outside of an overlap period, and "Duplicate" for records invalidated based on redundancy within a single client data run.

FIGS. 7F-7I illustrate exemplary pseudocode that may be executed by a computing device, such as a service computing device 120 executing the method 700 described above in FIG. 7A. The various exemplary pseudocodes may be formatted as SQL commands. FIG. 7F illustrates an exemplary pseudocode that may be executed by the computing device to perform a duplicate validation as described above with reference to the operations in block 704. FIG. 7G illustrates an exemplary pseudocode that may be executed by the computing device to perform overlap validations as described above with reference to the operations in block 706. FIG. 7H illustrates an exemplary pseudocode that may be executed by the computing device to perform a delete validation as described above with reference to the operations in block 708. FIG. 7I illustrates an exemplary pseudocode that may be executed by the computing device to perform clean-up validations as described above with reference to the operations in block 710. It should be appreciated that the pseudocode of FIGS. 7F-7I may not be operational or executable instructions, but instead general conceptual operations that may be formatted in various languages, styles, and techniques to implement operations related to the method 700.

Figure 8A:
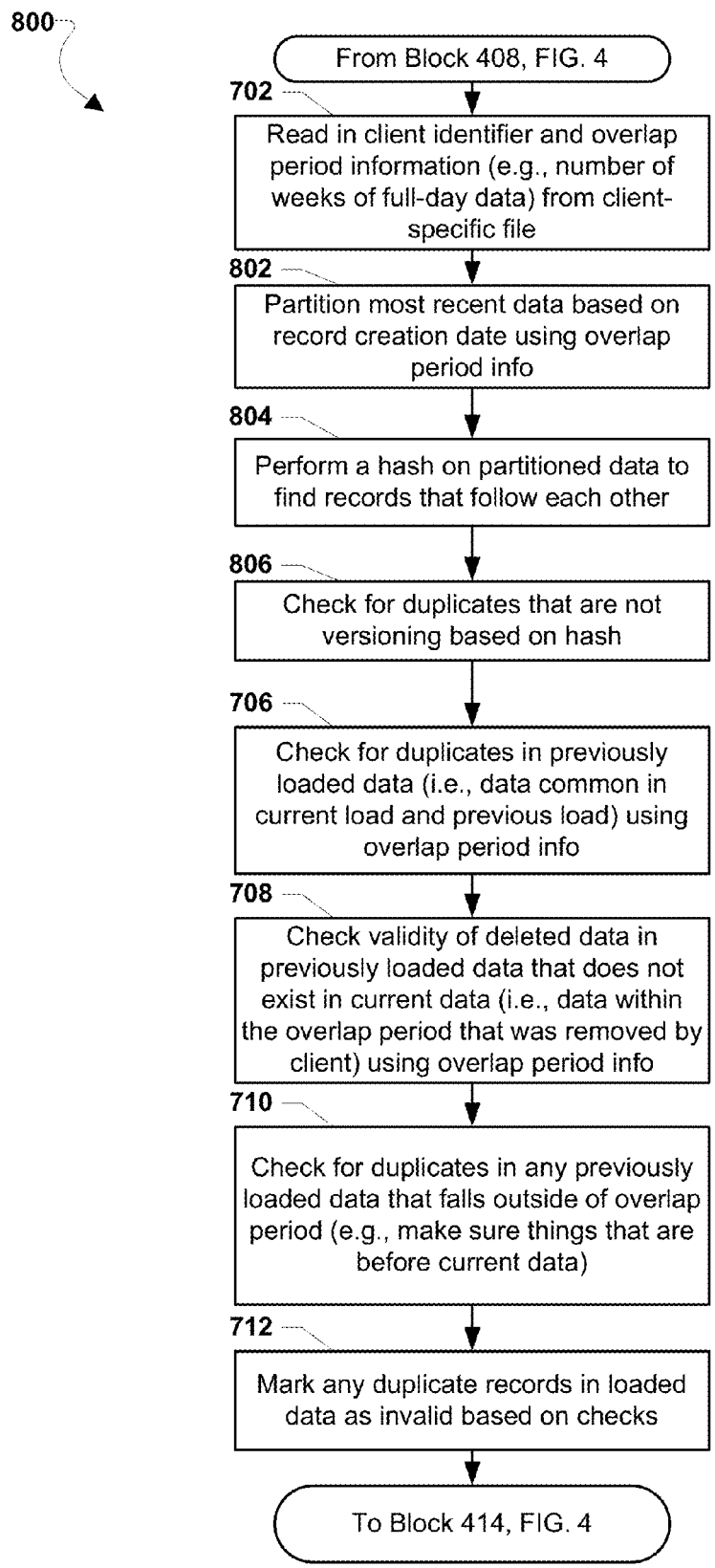
FIG. 8A is a process flow diagram illustrating an embodiment method for a computing device to perform validity checks with versioning considerations on data records loaded into stage tables.

FIG. 8A illustrates an embodiment method 800 for a computing device to perform validity checks with versioning considerations on data loaded into stage tables. The method 800 is similar to the method 700 described above, except the method 800 includes operations for identifying data records within stage tables that may include versioning information. As described above, versioning information may be status indications within data records that differentiate otherwise similar data records. For example, a stage data table related to personal data of employees (e.g., drivers) of a client entity (e.g., a trucking or delivery company) may include a plurality of data records corresponding to a certain employee identifier, but having different values in each data record regarding that employee's marital status (e.g., married, divorced, single, etc.). As another example, a stage data table may include a data record with a data field showing a certain employee to have a work status of "active" after a previous data record with a work status data field having a "terminated" value. Such values may seem inconsistent, but may not necessarily be erroneous, as employees may have changing statuses that are still accurate. Therefore, a computing device may perform certain operations to identify when similar data records include versioning information, and thus may mark such records as valid. In various embodiments, the method 800 may only be performed with certain types of data records, such as data tables of personnel information or records, as versioning may often only occur with employee status information.

In block 702, the computing device may identify client identifier and overlap period information from client-specific parameters, such as the parameters read-in with the operations in block 403 described above with reference to FIG. 4.

In various embodiments, client data may include different data records that have different "created" date values for each time a certain employee's status changes. For example, client data may include a first data for a driver that indicates the driver is not married on a first day and a second data for the driver that indicates the driver is married on a second day, each of the first and second data having different creation date values. The computing device may perform the following versioning operations to ensure stage tables do not include more than one data record related to the same employee and data record creation date. Thus, in block 802, the computing device may partition the most recent data based on record creation data using overlap period information. In other words, the computing device may identify the data from the most recent client data run defined by the client-specific parameters. For example, the computing device may order data records of a stage table using a data table column related to the date the data records were created by a client entity computer system. In block 804, the computing device may perform a hash on the partitioned data to find records that follow each other. In other words, the computing device may use a hash algorithm, operations, method, or other routine to identify data records that correspond to the same employee and that are ordered together (or contiguously). For example, the computing device may identify any two data records related to a certain driver employee that are subsequent to each other. In block 806, the computing device may check for duplicate records that are not versioning based on the hash. In other words, the computing device may identify versioning in data records that indicate a change in status associated with a single element, such as employment status changes for a single employee. For example, versioning may be present in data records for a particular driver employee that indicate a marital status change from single to married (or vice versa). Status changes may include various conditions of elements represented by the client data, such as marital status change and work status (e.g., hired, fired, terminated, laid-off, etc.). The computing device may compare the hashes, in order, to identify the subsequent state of change of records (or versioning) and thus identify data records that are merely duplicate records and not data records that include status changes. For example, when the computing device identifies a data record subsequent to another data record, where both records relate to the same driver employee identifier and include all the same values for the other data fields, the computing device may determine that one of the data records is a duplicate.

In block 706, the computing device may check for duplicates between previously loaded data (e.g., data records within stage tables associated with previous loads of client data) and most recently loaded data using the overlap period information. In block 708, the computing device may check the validity of deleted data in previously loaded data that does not exist in most recent loaded data using the overlap period information. In an embodiment, the operations in block 708 may be optional for the method 800. In block 710, the computing device may check for duplicates in any previously loaded data that falls outside of the overlap period. In block 712, the computing device may mark any duplicate records in the loaded data as invalid based on the checks. In an embodiment, the computing device may continue with the operations in determination block 414 after executing the operations in block 712.

In various embodiments, the computing device may execute SQL update statements to perform the various checking operations of the method 800. Such SQL update statements may be configured to be generic enough for using with a multi-tenant stage table, but flexible enough to define different overlapping periods customized to particular clients. Examples of such SQL statements are found in FIGS. 7F-7I and FIG. 8B.

FIG. 8B illustrates exemplary pseudocode (e.g., SQL commands) that may be executed by a computing device when performing versioning checks, such as during the operations of the method 800 described above in FIG. 8A. In particular, FIG. 8B provides example pseudocode for performing a hash. In an embodiment, the computing device may execute operations similar to those illustrated with the pseudocode of FIG. 8B along with other validation operations, such as described above with reference to the examples in FIGS. 7F-7I. It should be appreciated that the pseudocode of FIG. 8B may not be operational or executable instructions, but instead general conceptual operations that may be formatted in various languages, styles, and techniques to implement operations related to the method 800.

FIGS. 9A-9C illustrate an exemplary stage table 900 corresponding to the execution of validity checks related to versioning on data records by a computing device. The stage table 900 may include various data columns 901-906, such as a first data column 901 having record identifiers, a second data column 902 having created date values (e.g., the date the data record was generated by a client entity), a third data column 903 having reference identifiers (e.g., employee numbers, names, social security numbers, etc.), a fourth data column 904 having event date values (e.g., hiring event date, termination event date, etc.), a fifth data column 905 having status codes (e.g., indicating various status characteristics of a subject/employee, such as hired, terminated, married, single, etc.), and a sixth data column 906 having values indicating whether the data records are valid or invalid. The stage table 900 may also include various data records 910-917 that were received and loaded by the computing device in various client data runs.

FIG. 9A shows the stage table 900 as it may exist prior to the computing device performing the method 800 described above. In other words, the values in the sixth data column 906 may all indicate that the corresponding data records 910-917 are valid (i.e., 'Y'). FIGS. 9B-9C show the stage table 900 after the computing device performed the method 800. As described above, because of the support for versioning, the computing device may perform duplication validation operations differently for particular types of stage tables (e.g., stage tables that include personnel or employee data). The computing device may evaluate such data records of the stage table 900 in chronological order to identify duplicate data records related to the same subject (e.g., an employee identifier) and having the same creation date (e.g., same values in a "person creation date" data column 902). If data records are identified that have the same creation date, the computing device may invalidate the earlier (or older) data record (i.e., the data record having a lower record identifier or index in the stage table). The computing device may also evaluate the data records to identify duplicate data records for the same subject (e.g., employee identifier) that are ordered contiguously and that indicate changes in state or status. For example, two data records may be determined to be duplicates, but if there is a data record that occurs between the two, then the computing device may not invalidate either of the two data records. The computing device may perform a hashing algorithm to detect state or status changes, ordered by a particular data field within the data records (e.g., a record creation date). The computing device may invalidate the later record as invalid to ensure that the state of the corresponding employee is reflected as early as possible in aggregation tables.

For the purpose of non-limiting illustration: FIG. 9B shows the results after a first pass of versioning operations. The computing device may mark the data field 920 of a first data record 913 as invalid (i.e., 'N') as the data record 913 shared the same value in the third data column 903 (e.g., employee identifier) as well as the same value in the second data column 902 (i.e., creation date) as with a second data record 914. The first data record 913 may be invalidated instead of the second data record 914 as the first data record 913 has a lower (or earlier) record identifier (i.e., '1111' is less than '4'). FIG. 9C shows the results after a second pass of versioning operations. The computing device may mark the data field 930 of a third data record 911 as invalid (i.e., 'N') as the values in data columns 902-905 are the same in both the third data record 911 and a fourth data record 910.

Although the data records 914 and 916 may include the same values for data columns 903-905 and the data records 915 and 917 may include the same values for data columns 903-905, the computing device may not mark these data records 914-917 as invalid. In particular, the computing device may not mark either data record 914 or 916 invalid as data record 915 is ordered in between the data records 914, 916. Similarly, the computing device may not mark either data record 915 or 917 invalid as data record 916 is ordered in between the data records 915, 917. This may be because data records 914-917 indicate a valid status changes of the employee associated with the '0002' reference identifier (in the third data column 903) through the month. For example, due to encodings or internal policies within a client entity computer system, a contract or temporary driver employee may be technically hired for each trip and terminated at the completion of that trip.

Figure 10:
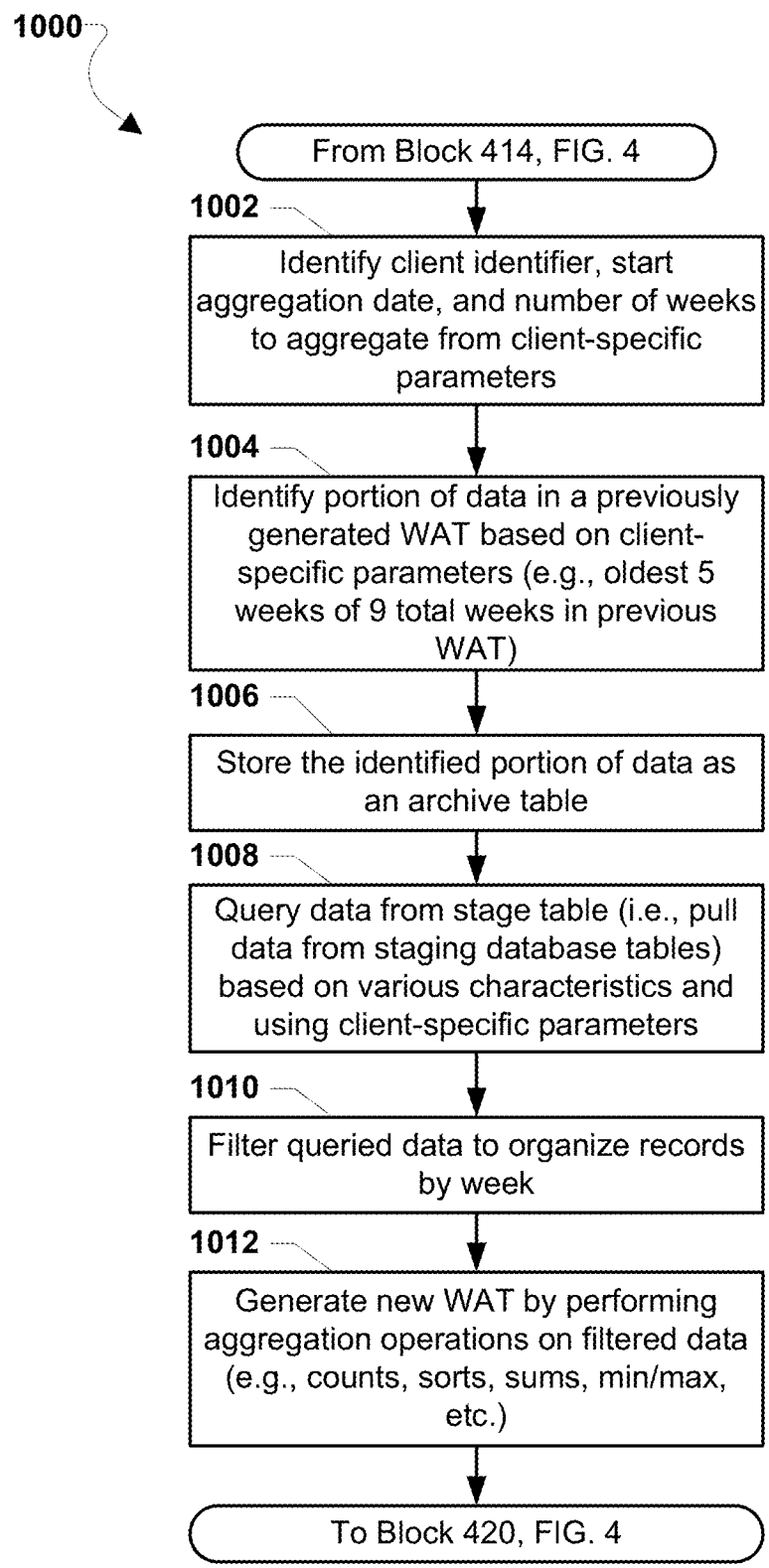
FIG. 10 is a process flow diagram illustrating an embodiment method for a computing device to aggregate data within stage tables into weekly aggregated tables (WATs).

FIG. 10 illustrates an embodiment method 1000 for a computing device to aggregate data within stage tables into weekly aggregated tables (WATs). As described above, once duplicate data records have been invalidated and other various validity checks have been performed, the computing device may analyze and combine various data into WATs for use in predictive modeling operations. In particular, the computing device may extract data from stage tables and aggregate data into weeks for storage in WATs. In an embodiment, the operations in the method 1000 may be performed by the computing device in place of the operations in block 210 in method 200 as described above with reference to FIG. 2 and/or in place of the operations in block 416 in method 400 as described above with reference to FIG. 4. Accordingly, in an embodiment, the operations in the method 1000 may be performed by the computing device after performing the operations in determination block 414 of the method 400.

In block 1002, the computing device may identify client identifier, start aggregation date, number of weeks to aggregate, and other information from client-specific parameters, such as the parameters read-in with the operations in block 403 described above with reference to FIG. 4. In various embodiments, this identified information may be identified by the computing device from various client-specific files accessible by the computing device. The start aggregation date may be a customizable date set by a client entity associated with the client identifier, enabling the computing device to calculate aggregation information for various time windows. In other words, the parameters may indicate the time and day of week that defines the start of data to use in aggregation operations. This may be valuable in providing client entities with customized aggregation and delivery of data that allows client entities to receive data as soon as convenient and/or when the data may best be used by the entities.

In various embodiments, the computing device may be configured to archive, store, or otherwise make available archive tables that include aggregated and processed data based on previous executions of the method 1000. In other words, the computing device may save information describing previously-generated WATs. For example, portions of a previously-generated WAT for a client entity may be stored in a database in response to the computing device executing the next run of the method 1000 for client data from that client entity. Such archived data may be valuable to avoid re-calculating aggregated information for various uses. Accordingly, in block 1004, the computing device may identify a portion of data in a previously-generated WAT based on the client-specific parameters. For example, based on client-specific parameters that indicate the number of weeks of new client data that will be aggregated in a subsequent run, the computing device may identify the data that will be aggregated again and represented in the subsequent WAT. In an embodiment, the identified portion of data may be the latest data within the previously-generated WAT (i.e., the data that represents the most recent weeks of aggregated data for a particular client entity or client identifier). In an embodiment, the number of weeks represented by the identified portion of data may be equal to the total number of weeks in an aggregation period subtracted by the number of new weeks represented in a subsequent client data run, such as described above with reference to the operations in the block 402.

As a non-limiting illustration: client-specific parameters for a particular client entity may indicate there are a total of nine (9) weeks in an aggregation period and four (4) weeks of new (or never before aggregated) data in each client data run. Based on these parameters, the computing device may identify the most recent five (5) weeks of the previously-generated WAT to be archived in an archive table. Then, as described below, the computing device may generate a new WAT corresponding to nine (9) weeks of data by aggregating four (4) new weeks of data and the identified five (5) weeks of data that were archived. Thus, the identified five (5) weeks of data may be aggregated more than once by the computing device.

In block 1006, the computing device may store (or archive) the identified portion of data within the previously-generated WAT as an archive table. In various embodiments, the archive table may be structurally identical to the generated WAT, but may or may not have different naming conventions. As described above, such archive tables may simply be backups of the data in already-generated WATs and may be stored prior to the computing device performing aggregation (or re-aggregation) operations as described below. Archive tables may be valuable as they serve as snapshots of data within generated WATs, and may be used to investigate previous iterations of aggregation operations. In various embodiments, the archive table may be used by the computing device to recover data when corrupted data is identified. In another embodiment, the computing device may utilize the archive table during audit and/or troubleshooting operations. In an embodiment, once the archive table is stored, the computing device may delete, remove from memory, nullify, or otherwise disregard the remaining data within the previously-generated WAT. For example, the previously-generated WAT (or its associated data) may be marked for overwriting by the computing device.

In block 1008, the computing device may query data from a stage table based on various characteristics and using the client-specific parameters. In other words, the computing device may pull data from stage data tables that coincide with the aggregation parameters and dates indicated in the client-specific parameters. For example, the computing device may pull data records for a certain number of weeks and related to a particular client entity based on the client-specific parameters. In an embodiment, the computing device may perform the query operations by executing various SQL commands (e.g., "left outer joins" commands). For example, the computing device may perform a join SQL command between a table of summary data related to driver information (e.g., trucking delivery data) and a stage table including additional, recently received trip data. In various embodiments, as certain data fields in stage tables may only indicate the occurrence of events, the query commands may also be configured to identify the absence of certain events. For example, the computing device may query stage tables to identify whether an employee encountered or did not encounter a service failure (or failure to complete a job) related to a trucking trip during a certain time period.

In block 1010, the computing device may filter the queried data to organize records by week. For example, the computing device may sort the queried data to ensure it is in order by employee identifier as well as week. In an embodiment, the computing device may filter the queried data by partitioning the data into subjects, topics, data types, or any other attribute in order to promote efficient aggregation. In various embodiments, the computing device may filter the data by performing threshold tests on data in stage tables to remove data related to dates that are not indicated within the client-specific parameters (e.g., data record creation date outside of the custom aggregation time period, data record has an erroneous data field value regarding employee hire date, etc.).

In block 1012, the computing device may generate a new WAT by performing aggregation operations on the filtered data, such as performing counts, sorts, sums, and min/max operations. The computing device may only perform aggregation operations on data records within stage tables that are not marked as invalid. In other words, data that is aggregated must have passed the various checks described above. The computing device may perform the aggregation operations from scratch for each iteration.

In various embodiments, the computing device may generate different types of weekly aggregated tables. In particular, the computing device may generate a detail WAT that includes non-aggregated information that correspond directly to related stage data. The computing device may generate a summary WAT that includes summarized data that includes values that are organized or partitioned by weeks. The computing device may also generate a history table that includes aggregated data that is not necessarily organized in weeks. For example, the history table may include aggregated data that spans or includes information from large time frames (e.g., 28 days, 6 months, 1 year, etc.).

In an embodiment, after executing the operations in block 1012, the computing device may continue with the operations in block 420 as described above with reference to FIG. 4.

Figure 11:
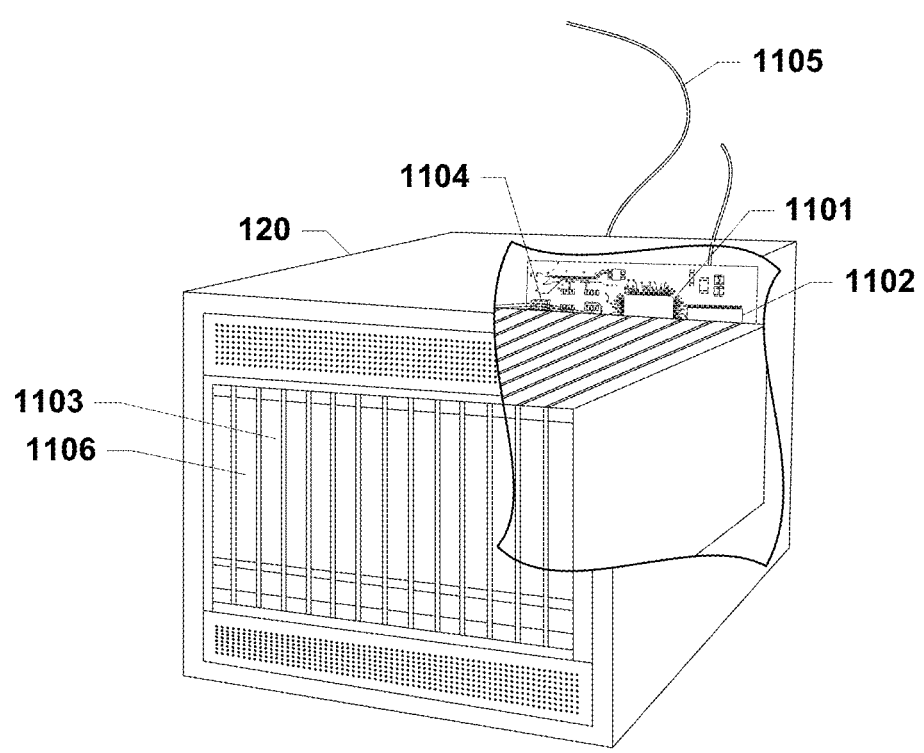
FIG. 11 is a component block diagram of a service computing device suitable for use in an embodiment.

The various embodiments may be implemented on any of a variety of commercially available servers, such as a service computing device 120 used by a predictive modeling service, as illustrated in FIG. 11. Such a service computing device 120 typically includes a processor 1101 coupled to volatile memory 1102 and a large capacity nonvolatile memory, such as a disk drive 1103. The service computing device 120 may also include a floppy disc drive, compact disc (CD) or DVD disc drive 1106 coupled to the processor 1101. The service computing device 120 may also include network access ports 1104 coupled to the processor 1101 for establishing data connections with a network 1105, such as a local area network coupled to other broadcast system computers and servers.

The processor 1101 may be any programmable microprocessor, microcomputer or multiple processor chip or chips that can be configured by software instructions (applications) to perform a variety of functions, including the functions of the various aspects described above. Multiple processors may be provided in the service computing device 120, such as one processor dedicated to wireless communication functions and one processor dedicated to running other applications. Typically, software applications may be stored in the internal memory 1102 before they are accessed and loaded into the processor 1101. The processor 1101 may include internal memory sufficient to store the application software instructions. In an embodiment, the internal memory may be a volatile or nonvolatile memory, such as flash memory, or a mixture of both. For the purposes of this description, a general reference to memory refers to memory accessible by the processor 1101 including internal memory or removable memory plugged into the computing device 120 and memory within the processor 1101.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module that may reside on a tangible, non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium that may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a computing device to aggregate data into weekly aggregated tables for use with predictive modeling operations, comprising:
   receiving client data associated with client-specific parameters, wherein the client-specific parameters are indicated by configurable metadata;
   determining whether the client data includes overlapping or redundant data;
   validating the client data based on the determining, wherein validating the client data comprises:
      checking for duplicate data in a most recent portion of the received client data;
      checking for the duplicate data between previously processed data and the most recent portion of the received client data using an overlap period, wherein the previously processed data includes client data from a previous client data run;
      checking a validity of data in the previously processed data that does not exist in the most recent portion of the received client data;
      checking for duplicate data in the previously processed data that does not correspond to the overlap period; and
      marking duplicate data records as invalid based on the checks;
   aggregating the received client data by week based on the client-specific parameters; and
   generating aggregated data tables for use with a predictive modeling engine based on the aggregated client data.

2. The method of claim 1, further comprising loading portions of the received client data into stage tables, wherein the portions are loaded from flat files based on the client-specific parameters,
   wherein aggregating the received client data comprises aggregating the received client data loaded within the stage tables based on the client-specific parameters.

3. The method of claim 2, further comprising:
   performing control checks of the loaded portions of the received client data using at least one of standard thresholds and the client-specific parameters; and
   cleaning the loaded portions of the received client data within the stage tables when the loaded portions of the received client data is determined to not be valid.

4. The method of claim 1, further comprising:
   performing control checks of the processed client data to confirm an absence of duplicate data using the client-specific parameters; and
   cleaning the processed client data stored within stage tables when the processed client data is determined to not be valid.

5. The method of claim 1, wherein checking for duplicate data in a most recent portion of the received client data comprises:
   partitioning the most recent portion of the received client data based on a creation date associated with the received client data and using the overlap period;
   performing a hash on the partitioned data to find data records that follow each other; and
   checking for duplicate data records that do not represent versioning based on the performed hash, wherein versioning comprises a change in status associated with a single element.

6. The method of claim 5, wherein the status includes at least one of a marital status and a work status, and wherein the single element includes a single employee.

7. The method of claim 5, wherein the received client data is personnel data.

8. The method of claim 1, wherein aggregating the received client data by week based on the client-specific parameters comprises:
   querying data from a stage table based on the client-specific parameters, wherein the client-specific parameters indicate a number of weeks to aggregate the received client data;
   filtering the queried data to organize associated data records by week; and
   performing aggregation operations on the filtered data, wherein the aggregation operations include at least one of a count operation, a sorting operation, a sum operation, and a min/max operation.

9. The method of claim 8, further comprising archiving data from the generated aggregated data tables.

10. The method of claim 1, wherein the received client data includes at least one of driver information, trip and telematics information, financial information, medical information, and employment information.

11. The method of claim 1, wherein the generated aggregated data tables include at least one of summary information, historical information, and detailed information.

12. The method of claim 1, wherein the client-specific parameters indicate at least one of a beginning and an end of a one-week aggregation period, a location of a flat file, an overlap period, a number of weeks to aggregate client data, and a type of weekly aggregated table to generate.

13. A computing device, comprising:
means for receiving client data associated with client-specific parameters, wherein the client-specific parameters are indicated by configurable metadata;
means for determining whether the client data includes overlapping or redundant data;
means for validating the client data based on the determining, wherein the means for validating the client data comprises:
  means for checking for duplicate data in a most recent portion of the received client data;
  means for checking for the duplicate data between previously processed data and the most recent portion of the received client data using an overlap period, wherein the previously processed data includes client data from a previous client data run;
  means for checking a validity of data in the previously processed data that does not exist in the most recent portion of the received client data;
  means for checking for duplicate data in the previously processed data that does not correspond to the overlap period; and
  means for marking duplicate data records as invalid based on the checks;
means for aggregating the received client data by week based on the client-specific parameters; and
means for generating aggregated data tables for use with a predictive modeling engine based on the aggregated client data.

14. The computing device of claim 13, further comprising means for loading portions of the received client data into stage tables, wherein the portions are loaded from flat files based on the client-specific parameters,
wherein means for aggregating the received client data comprises means for aggregating the received client data loaded within the stage tables based on the client-specific parameters.

15. The computing device of claim 14, further comprising:
means for performing control checks of the loaded portions of the received client data using at least one of standard thresholds and the client-specific parameters; and
means for cleaning the loaded portions of the received client data within the stage tables when the loaded portions of the received client data is determined to not be valid.

16. The computing device of claim 13, further comprising:
means for performing control checks of the processed client data to confirm an absence of duplicate data using the client-specific parameters; and
means for cleaning the processed client data stored within stage tables when the processed client data is determined to not be valid.

17. The computing device of claim 13, wherein means for checking for duplicate data in a most recent portion of the received client data comprises:
means for partitioning the most recent portion of the received client data based on a creation date associated with the received client data and using the overlap period;
means for performing a hash on the partitioned data to find data records that follow each other; and
means for checking for duplicate data records that do not represent versioning based on the performed hash, wherein versioning comprises a change in status associated with a single element.

18. The computing device of claim 17, wherein the status includes at least one of a marital status and a work status, and wherein the single element includes a single employee.

19. The computing device of claim 17, wherein the received client data is personnel data.

20. The computing device of claim 13, wherein means for aggregating the received client data by week based on the client-specific parameters comprises:
means for querying data from a stage table based on the client-specific parameters, wherein the client-specific parameters indicate a number of weeks to aggregate the received client data;
means for filtering the queried data to organize associated data records by week; and
means for performing aggregation operations on the filtered data including at least one of a count operation, a sorting operation, a sum operation, and a min/max operation.

21. The computing device of claim 20, further comprising means for archiving data from the generated aggregated data tables.

22. The computing device of claim 13, wherein the received client data includes at least one of driver information, trip and telematics information, financial information, medical information, and employment information.

23. The computing device of claim 13, wherein the generated aggregated data tables include at least one of summary information, historical information, and detailed information.

24. The computing device of claim 13, wherein the client-specific parameters indicate at least one of a beginning and an end of a one-week aggregation period, a location of a flat file, an overlap period, a number of weeks to aggregate client data, and a type of weekly aggregated table to generate.

25. A computing device, comprising:
a memory; and
a processor coupled to the memory, wherein the processor is configured with processor-executable instructions to perform operations comprising:
  receiving client data associated with client-specific parameters, wherein the client-specific parameters are indicated by configurable metadata;
  determine whether the client data includes overlapping or redundant data;
  validate the client data based on the determination, wherein the processor is configured with processor-executable instructions to validate the client data comprises:
    checking for duplicate data in a most recent portion of the received client data;
    checking for duplicate data between previously processed data and the most recent portion of the received client data using an overlap period indicated by the client-specific parameters, wherein the previously processed data includes client data from a previous client data run;
    checking a validity of data in the previously processed data that does not exist in the most recent portion of the received client data;
    checking for duplicate data in the previously processed data that does not correspond to the overlap period; and
    marking duplicate data records as invalid based on the checks;

aggregating the received client data by week based on the client-specific parameters; and
generating aggregated data tables for use with a predictive modeling engine based on the aggregated client data.

26. The computing device of claim 25, wherein the processor is configured with processor-executable instructions to perform operations further comprising loading portions of the received client data into stage tables, wherein the portions are loaded from flat files based on the client-specific parameters, and
wherein the processor is configured with processor-executable instructions to perform operations such that aggregating the received client data comprises aggregating the received client data loaded within the stage tables based on the client-specific parameters.

27. The computing device of claim 26, wherein the processor is configured with processor-executable instructions to perform operations further comprising:
performing control checks of the loaded portions of the received client data using at least one of standard thresholds and the client-specific parameters; and
cleaning the loaded portions of the received client data within the stage tables when the loaded portions of the received client data is determined to not be valid.

28. The computing device of claim 25, wherein the processor is configured with processor-executable instructions to perform operations further comprising:
performing control checks of the processed client data to confirm an absence of duplicate data using the client-specific parameters; and
cleaning the processed client data stored within stage tables when the processed client data is determined to not be valid.

29. The computing device of claim 25, wherein the processor is configured with processor-executable instructions to perform operations such that checking for duplicate data in a most recent portion of the received client data comprises:
partitioning the most recent portion of the received client data based on a creation date associated with the received client data and using the overlap period;
performing a hash on the partitioned data to find data records that follow each other; and
checking for duplicate data records that do not represent versioning based on the performed hash, wherein versioning comprises a change in status associated with a single element.

30. The computing device of claim 29, wherein the processor is configured with processor-executable instructions to perform operations such that the status includes at least one of a marital status and a work status, and wherein the single element includes a single employee.

31. The computing device of claim 29, wherein the processor is configured with processor-executable instructions to perform operations such that the received client data is personnel data.

32. The computing device of claim 25, wherein the processor is configured with processor-executable instructions to perform operations such that aggregating the received client data by week based on the client-specific parameters comprises:
querying data from a stage table based on the client-specific parameters, wherein the client-specific parameters indicate a number of weeks to aggregate the received client data;
filtering the queried data to organize associated data records by week; and
performing aggregation operations on the filtered data, wherein the aggregation operations include at least one of a count operation, a sorting operation, a sum operation, and a min/max operation.

33. The computing device of claim 32, wherein the processor is configured with processor-executable instructions to perform operations further comprising archiving data from the generated aggregated data tables.

34. The computing device of claim 25, wherein the processor is configured with processor-executable instructions to perform operations such that the received client data includes at least one of driver information, trip and telematics information, financial information, medical information, and employment information.

35. The computing device of claim 25, wherein the processor is configured with processor-executable instructions to perform operations such that the generated aggregated data tables include at least one of summary information, historical information, and detailed information.

36. The computing device of claim 25, wherein the processor is configured with processor-executable instructions to perform operations such that the client-specific parameters indicate at least one of a beginning and an end of a one-week aggregation period, a location of a flat file, an overlap period, a number of weeks to aggregate client data, and a type of weekly aggregated table to generate.

37. A non-transitory processor-readable storage medium having stored thereon processor-executable software instructions configured to cause a processor to perform operations comprising:
receiving client data associated with client-specific parameters, wherein the client-specific parameters are indicated by configurable metadata;
determining whether the client data includes overlapping or redundant data;
validating the client data based on the determining, wherein validating the client data comprises:
checking for duplicate data in a most recent portion of the received client data;
checking for the duplicate data between previously processed data and the most recent portion of the received client data using an overlap period, wherein the previously processed data includes client data from a previous client data run;
checking a validity of data in the previously processed data that does not exist in the most recent portion of the received client data;
checking for duplicate data in the previously processed data that does not correspond to the overlap period; and
marking duplicate data records as invalid based on the checks;
aggregating the received client data by week based on the client-specific parameters; and
generating aggregated data tables for use with a predictive modeling engine based on the aggregated client data.

38. The non-transitory processor-readable storage medium of claim 37, wherein the stored processor-executable software instructions are configured to cause the processor to perform operations further comprising loading portions of the received client data into stage tables, wherein the portions are loaded from flat files based on the client-specific parameters,
wherein the stored processor-executable software instructions are configured to cause the processor to perform operations such that aggregating the received client data comprises aggregating the received client data loaded within the stage tables based on the client-specific parameters.

39. The non-transitory processor-readable storage medium of claim 38, wherein the stored processor-executable software instructions are configured to cause the processor to perform operations further comprising:
performing control checks of the loaded portions of the received client data using at least one of standard thresholds and the client-specific parameters; and
cleaning the loaded portions of the received client data within the stage tables when the loaded portions of the received client data is determined to not be valid.

40. The non-transitory processor-readable storage medium of claim 37, wherein the stored processor-executable software instructions are configured to cause the processor to perforin operations further comprising:
performing control checks of the processed client data to confirm an absence of duplicate data using the client-specific parameters; and
cleaning the processed client data stored within stage tables when the processed client data is determined to not be valid.

41. The non-transitory processor-readable storage medium of claim 37, wherein the stored processor-executable software instructions are configured to cause the processor to perform operations such that checking for duplicate data in a most recent portion of the received client data comprises:
partitioning the most recent portion of the received client data based on a creation date associated with the received client data and using the overlap period;
performing a hash on the partitioned data to find data records that follow each other; and
checking for duplicate data records that do not represent versioning based on the performed hash, wherein versioning comprises a change in status associated with a single element.

42. The non-transitory processor-readable storage medium of claim 41, wherein the stored processor-executable software instructions are configured to cause the processor to perform operations such that the status includes at least one of a marital status and a work status, and wherein the single element includes a single employee.

43. The non-transitory processor-readable storage medium of claim 41, wherein the stored processor-executable software instructions are configured to cause the processor to perform operations such that the received client data is personnel data.

44. The non-transitory processor-readable storage medium of claim 37, wherein the stored processor-executable software instructions are configured to cause the processor to perform operations such that aggregating the received client data by week based on the client-specific parameters comprises:
querying data from a stage table based on the client-specific parameters, wherein the client-specific parameters indicate a number of weeks to aggregate the received client data;
filtering the queried data to organize associated data records by week; and
performing aggregation operations on the filtered data, wherein the aggregation operations include at least one of a count operation, a sorting operation, a sum operation, and a min/max operation.

45. The non-transitory processor-readable storage medium of claim 44, wherein the stored processor-executable software instructions are configured to cause the processor to perform operations further comprising archiving data from the generated aggregated data tables.

46. The non-transitory processor-readable storage medium of claim 37, wherein the stored processor-executable software instructions are configured to cause the processor to perform operations such that the received client data includes at least one of driver information, trip and telematics information, financial information, medical information, and employment information.

47. The non-transitory processor-readable storage medium of claim 37, wherein the stored processor-executable software instructions are configured to cause the processor to perform operations such that the generated aggregated data tables include at least one of summary information, historical information, and detailed information.

48. The non-transitory processor-readable storage medium of claim 37, wherein the stored processor-executable software instructions are configured to cause the processor to perform operations such that the client-specific parameters indicate at least one of a beginning and an end of a one-week aggregation period, a location of a flat file, an overlap period, a number of weeks to aggregate client data, and a type of weekly aggregated table to generate.

* * * * *